(12) United States Patent
Mills et al.

(10) Patent No.: US 10,304,306 B2
(45) Date of Patent: May 28, 2019

(54) SMOKE DETECTION SYSTEM AND METHOD USING A CAMERA

(71) Applicant: Smoke Detective, LLC, Pittsburgh, PA (US)

(72) Inventors: Russell P. Mills, Coraopolis, PA (US); Gustavo K. Rohde, Pittsburgh, PA (US); Frederick Lanni, Pittsburgh, PA (US); Stephen C Davis, Jr., Allison Park, PA (US)

(73) Assignee: Smoke Detective, LLC, Pittsburgh, PA (US)

( * ) Notice: Subject to any disclaimer, the term of this patent is extended or adjusted under 35 U.S.C. 154(b) by 164 days.

(21) Appl. No.: 15/194,878

(22) Filed: Jun. 28, 2016

(65) Prior Publication Data
US 2016/0307424 A1 Oct. 20, 2016

Related U.S. Application Data

(63) Continuation-in-part of application No. 14/625,689, filed on Feb. 19, 2015.

(51) Int. Cl.
H04N 7/18 (2006.01)
G08B 17/12 (2006.01)
G06K 9/62 (2006.01)
G06K 9/00 (2006.01)

(52) U.S. Cl.
CPC ....... G08B 17/125 (2013.01); G06K 9/00771 (2013.01); G06K 9/6202 (2013.01); H04N 7/183 (2013.01)

(58) Field of Classification Search
CPC ..... G08B 17/125; G06K 9/0071; H04N 7/183
See application file for complete search history.

(56) References Cited

U.S. PATENT DOCUMENTS

| 5,926,280 A | 7/1999 | Yamagishi et al. |
| 7,245,315 B2 | 7/2007 | Sadok |
| 7,256,818 B2 | 8/2007 | Sadok |

(Continued)

OTHER PUBLICATIONS

United States Patent and Trademark Office; Office Action; Office Action from U.S. Appl. No. 14/625,689; pp. 1-20; publisher United States Patent and Trademark Office; published Alexandria, Virginia, USA; copyright and dated Apr. 10, 2017; copy enclosed (20 pages).

(Continued)

Primary Examiner — Jonathan R Messmore

(57) ABSTRACT

Image-based fire detection methods are provided which include analyzing a field of view based on a plurality of images, determining if changes occur, and analyzing whether any such changes are due to smoke-like material. Changes due to large objects are ruled out, and drift in the scene or shaking of the image collection device is accounted for by the method. The methods employ representing images of the field of view with quantifiable values and comparing to thresholds established for each event, and activating an alarm if changes due to smoke-like material are detected. The fire detection methods may also include monitoring a field of view for changes, and only performing the analysis on the images if changes are detected. The monitoring and validating stages of the methods include collecting images at different sampling rates for different amounts of information.

42 Claims, 12 Drawing Sheets

(56) References Cited

U.S. PATENT DOCUMENTS

| | | | |
|---|---|---|---|
| 7,280,696 | B2 | 10/2007 | Zakrzewski |
| 7,456,749 | B2 * | 11/2008 | Anderson ............ G08B 17/125 340/578 |
| 7,495,573 | B2 | 2/2009 | Tice et al. |
| 7,609,856 | B2 | 10/2009 | Chen |
| 7,804,522 | B2 | 9/2010 | Haynes |
| 8,754,942 | B2 | 6/2014 | Hanses et al. |
| 8,804,119 | B2 | 8/2014 | Knox |
| 8,947,508 | B2 | 2/2015 | Morimitsu |
| 9,769,430 | B1 * | 9/2017 | Bechtel ................. H04N 7/183 |
| 2002/0024446 | A1 | 2/2002 | Grech-Cini |
| 2002/0135490 | A1 | 9/2002 | Opitz |
| 2005/0069207 | A1 | 3/2005 | Zakrzewski |
| 2006/0110047 | A1 * | 5/2006 | Reissman ............ G06K 9/6202 382/218 |
| 2006/0115154 | A1 | 6/2006 | Chen |
| 2006/0202847 | A1 | 9/2006 | Oppelt et al. |
| 2007/0019071 | A1 | 1/2007 | Haynes |
| 2008/0111701 | A1 | 5/2008 | Huang |
| 2009/0109193 | A1 * | 4/2009 | Masalkar ............. G06F 3/0425 345/175 |
| 2009/0123074 | A1 | 5/2009 | Chen et al. |
| 2009/0202114 | A1 * | 8/2009 | Morin ................... A63F 13/12 382/118 |
| 2009/0315722 | A1 | 12/2009 | Hou |
| 2010/0002104 | A1 | 1/2010 | On |
| 2011/0298622 | A1 * | 12/2011 | Pauly .................. G01V 5/0008 340/600 |
| 2014/0022385 | A1 | 1/2014 | Fischer |
| 2014/0022547 | A1 | 1/2014 | Knox et al. |
| 2014/0201844 | A1 * | 7/2014 | Buck ..................... G06F 21/50 726/26 |
| 2014/0203939 | A1 | 7/2014 | Harrington |
| 2014/0369567 | A1 * | 12/2014 | Chigos ................. G06K 9/3258 382/105 |
| 2014/0376817 | A1 * | 12/2014 | Yaguchi ............. A61B 1/00009 382/195 |
| 2015/0103149 | A1 * | 4/2015 | McNamer .......... H04N 5/23293 348/50 |
| 2015/0104106 | A1 * | 4/2015 | Elinas ................. G06K 9/4638 382/201 |
| 2015/0160175 | A1 | 6/2015 | Knox |
| 2015/0169984 | A1 | 6/2015 | Newton et al. |
| 2015/0213698 | A1 | 7/2015 | Peters et al. |
| 2016/0093239 | A1 * | 3/2016 | Wang ..................... G06F 1/32 345/55 |
| 2016/0260306 | A1 | 9/2016 | Jackel |
| 2016/0335796 | A1 * | 11/2016 | Roimela ................ G06T 17/05 |

OTHER PUBLICATIONS

Yu Chunyu; titled "Video Fire Smoke Detection Using Motion and Color Features"; Fire Technology, 2010, pp. 651-663, vol. no. 46; publisher Springer Science + Business Media, LLC; copyright date of 2009 by Springer Science + Business Media, LLC; published in USA; copy enclosed (13 pages).

I Kolesov; titled "Fire and Smoke Detection in Video with Optimal Mass Transport Based Optical Flow and Neural Networks"; Proceedings of 2010 IEEE 17th International Conference on Image Processing; Sep. 26-29, 2010; pp. 761-764; ICIP 2010; Hong Kong; copy enclosed (4 pages).

Hongda Tian; titled "Smoke Detection in Video: An Image Separation Approach"; Int J Comput Vis; 1014; pp. 192-209; vol. no. 106; publisher Springer Science + Business Media; copyright 2013 Springer Science + Business Media; published in New York, USA; copy enclosed (18 pages).

International Searching, Authority; International Search Report and Written Opinion of the International Searching Authority; International Application No. PCT/US2016/017067; Patent Cooperation Treaty; pp. 1-11; publisher United States International Searching Authority; Published Alexandria, Virginia, US; copyright and dated Apr. 13, 2016; copy enclosed (11 pages).

http://www.fike.com/products/spyderguard-video-flame-smoke-detection-monitoring-software/, last accessed Jan. 12, 2016.

Signifire, product brochure, by Fike, Corp., 2014.

Signifire Spyder Guard data sheet, by Fike Corp., Aug. 2010.

http://www.asl-systems.com/products.html, last accessed Jan. 12, 2016.

http://www.firevu.com/, last accessed Jan. 12, 2016.

http://www.det-tronics.com/Pages/Home.aspx, last accessed Jan. 12, 2016.

http://www.notifier.com/swift/Pages/default.aspx, last access Jan. 12, 2016.

SWIFT Intelligent Wireless Detectors, product sheet, 2015 by Honeywell International, Inc.

SWIFT FWSG Flashscan Wireless Gateway, product sheet, 2015, by Honeywell International, Inc.

SWIFT Intelligent Wireless Modules, product sheet, 2015, by Honeywell International, Inc.

International Searching Authority; International Search Report and Written Opinion of the International Searching Authority; International Application No. PCT/US2017/039691; Patent Cooperation Treaty; pp. 1-13; publisher United States International Searching Authority; Published Alexandria, Virginia, US; copyright and dated Sep. 8, 2017; copy enclosed (13 pages).

* cited by examiner

| 68 | 70 | 72 | 74 |
|---|---|---|---|
| 20 | 10 | 40 | 70 |
| 76 | 78 | 80 | 82 |
| 50 | 80 | 100 | 20 |
| 84 | 86 | 88 | 90 |
| 30 | 30 | 90 | 130 |

66 → REFERENCE

FIG. 3

| 68 | 70 | 72 | 74 |
|---|---|---|---|
| 10 | 10 | 30 | 90 |
| 76 | 78 | 80 | 82 |
| 60 | 70 | 150 | 80 |
| 84 | 86 | 88 | 90 |
| 50 | 40 | 170 | 200 |

66 → MEASURED

FIG. 4

| 68 | 70 | 72 | 74 |
|---|---|---|---|
| -10 | 0 | -10 | 20 |
| 76 | 78 | 80 | 82 |
| 10 | -10 | 50 | 60 |
| 84 | 86 | 88 | 90 |
| 20 | 10 | 80 | 70 |

66 → MEASURED - REFERENCE

FIG. 5

SMOKE DETECTION SYSTEM AND METHOD USING A CAMERA

CLAIM OF PRIORITY

The present application is a Continuation-in-Part of previously filed, now pending application having U.S. Ser. No. 14/625,689, filed on Feb. 19, 2015, which is incorporated by reference herein in its entirety.

FIELD OF THE INVENTION

The present invention relates generally to a smoke detection system and method that analyzes changes over various images to detect smoke, and therefore, fire. Further, the present application relates to a smoke detection system and method that can be deployed in conjunction with a number of different devices, including mobile and stationary devices.

BACKGROUND

Devices for the automatic detection of a fire are valuable because it is impossible for humans to be aware of their surroundings all of the time. Standard smoke detectors are known and can be one of several different types. For example, photoelectric smoke detectors are known that make use of a light beam and a light sensor capable of detecting the light beam. When smoke is not present, the light beam shines past the light sensor and does not contact the light sensor and the alarm is not activated. However, when smoke fills up a chamber through which the light beam travels, the light beam engages the smoke and is deflected or scattered some amount resulting in it engaging the sensor and being detected by the sensor. The alarm will then activate to warn people nearby of the presence of smoke, and hence fire. Other types of traditional smoke detectors utilize an ionization chamber and a source of ionizing radiation to detect smoke.

Fire detection devices are known that capture an image and then analyze the image in order to determine if flame is present in the image. One such device analyzes an image by looking at the intensity of the red, green, and blue color components of the image. Artificial light in the image is noted to exhibit only high luminance levels of the red component. These artificial sources of light may be tail lamps and headlights of vehicles. However, a flame that is present in the image will generate high luminance levels of both red and green components. In this manner, the fire detection device is able to analyze the color components of an image to determine if a flame is present, and to exclude other non-flame sources of illumination when detecting the fire.

A different fire detection device that makes use of image processing receives image data and then sends this image data to a fire detection module for detecting fire or signs of fire. Abstract information from the image such as texture, intensity, and color is evaluated. Object detection or segmentation is preferably not performed. The system uses a camera mounted onto the ceiling and has a field of view that extends along the ceiling but is not pointed downwards to the floor. A blinder or other blocking mechanism is used to prevent the camera from imaging the floor. This arrangement causes the system to focus only on the area of the ceiling where smoke will be detected, and to ignore movement on the floor that would otherwise confuse the system.

Additional fire detection systems have been proposed that seek to incorporate fire detection capabilities into a security system that uses imaging so that two separate systems, security and fire detection, can be combined into one for cost and utility savings. A beam of light is projected within the field of view of the camera, and changes in the light beam brought about by the presence of smoke will be detected by the system in order to alert the operator of the presence of fire.

There continues to be a need for devices that are capable of detecting the presence of fire and alerting people in order to provide them with adequate time to escape or put out the fire. Such a device should be mobile so that the user can take it with him or her when traveling and sleeping overnight in places that may or may not be equipped with smoke detectors. As such, there remains room for variation and improvement within the art.

SUMMARY

The present invention is directed to image-based methods of detecting smoke or smoke-like material in a field of view of an image collection device. The methods include collecting pluralities of images and performing analyses on the images to quantifiably determine certain values, and compare those values to predetermined thresholds indicating large or small changes, which may or may not be indicative of smoke.

In at least one embodiment, the method includes collecting a plurality of electronic images using an image collection device. Each image includes a plurality of pixels, each of which is defined by a quantitative pixel value. The pixel values of each image are compared to a pixel value threshold. Pixel values above this threshold indicate a change may have occurred. To rule out the possibility the change is due to large objects in the field of view, such as a person moving through the area, rather than smoke, the method then calculates a quantitative image pixel value which represents the total number of pixels in an image that have a pixel value over the pixel value threshold. If any of the images has an image pixel value over a predetermined image pixel value threshold, this indicates the change detected is a large object and not likely to be smoke. The method resumes collecting and analyzing images.

However, if an image pixel value is less than the image pixel value threshold, then the method continues with parsing each image into portions, such as tiles, and comparing corresponding portions to each other. Quantitative image portion values are then calculated for each portion based on a comparison of corresponding portions, such as by performing an error function to mathematically compare corresponding portions between at least two images. Accordingly, the image portion values may be a measure of the similarity or difference between corresponding portions. The image portion values of each corresponding portion set are compared to an image portion value threshold, which is indicative of small changes in the field of view. If any of the image portion values is less than the image portion value threshold, this indicates smoke-like material is present, and an alarm is activated.

In at least one embodiment, the method may include first monitoring the field of view, and only performing the above analysis if a change is detected. A first plurality of electronic images is collected at a first sampling rate, such as one image every few seconds. Corresponding portions of each of the first plurality of images are selected, and first image portion values for each corresponding portion set are calculated.

This calculation may be an error function, as noted above. The first image portion values are compared to a first image portion value threshold, and further analysis may be performed if any of the first image portion values less than the first image portion value threshold. If so, a second plurality of images is collected at a second sampling rate higher than the first sampling rate, such as a video where multiple images are collected per second. The analysis described above is then performed on this second plurality of images to rule out changes due to large objects/movement, and to confirm small changes which are indicative of smoke-like material.

In at least one embodiment, the second plurality of images may be converted to derivative images for further processing and analysis. Such conversion may isolate only the changes between images, so as to simplify further analysis. In addition, all of the images used in the methods of the present method may be converted between RGB and grayscale, as may be preferred for increased information or simplified computing. Also, the methods include steps to periodically update the reference image upon which the images and/or portions are compared during the analyses, so as to account for drift and maintain accurate information.

These and other features and advantages of the present invention will become clearer when the drawings and detailed description are taken into consideration.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended Figs. in which:

FIG. 3 is a top plan view of an array of pixels that receive light during a reference stage.

FIG. 4 is a top plan view of the array of pixels of FIG. 3 that receive light during a measurement stage.

FIG. 5 is a top view of the difference of the light intensity of the pixels between the reference and measurement stages of FIGS. 3 and 4.

Figure 1:
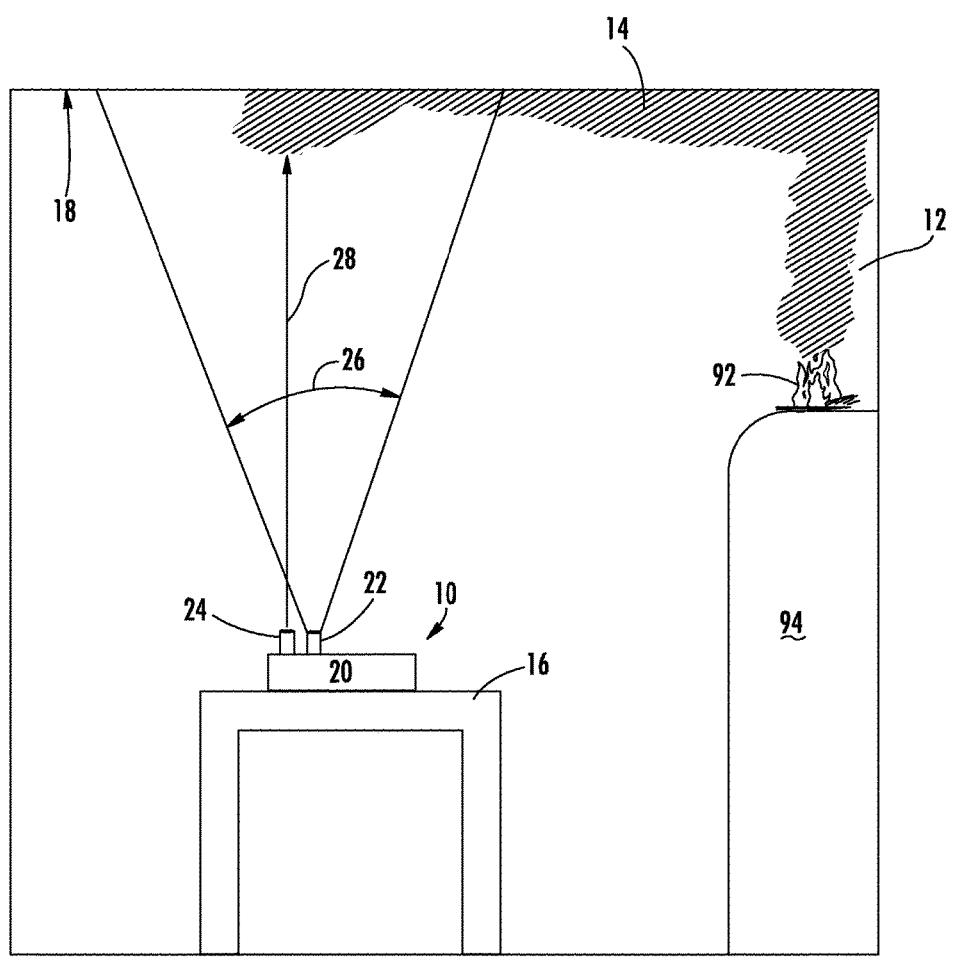
FIG. 1 is a side elevation view of a fire detection device located in a room in which smoke is present at the ceiling of the room.

Repeat use of reference characters in the present specification and drawings is intended to represent the same or analogous features or elements of the invention.

DETAILED DESCRIPTION OF REPRESENTATIVE EMBODIMENTS

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

It is to be understood that the ranges mentioned herein include all ranges located within the prescribed range. As such, all ranges mentioned herein include all sub-ranges included in the mentioned ranges. For instance, a range from 100-200 also includes ranges from 110-150, 170-190, and 153-162. Further, all limits mentioned herein include all other limits included in the mentioned limits. For instance, a limit of up to 7 also includes a limit of up to 5, up to 3, and up to 4.5.

The present invention provides for a fire detection device 10 that may employ a camera 22 in order to detect a fire 92 in a room 12 of a building. The fire detection device 10 makes use of a reference image and then compares subsequent images taken by the camera 22 and compares same to the reference image to determine whether a fire 92 is present. The fire detection device 10 may identify the presence of fire 92 through the identification of the flames themselves, or from smoke 14 produced from the fire 92. The fire detection device 10 may have a light 24 that illuminates the room 12 to aid the camera 22 in capturing the sequential images. The fire detection device 10 may be incorporated into a smart phone, cell phone, PDA, or other handheld communication device, or the fire detection device 10 may be a dedicated, stand alone device. Although providing benefit when sleeping in a location that does not have its own smoke detectors, the hand held device 10 may be used as a back-up device or can be used at any time or location and need not be only employed when the user is sleeping in other arrangements.

With reference now to FIG. 1, the fire detection device 10 is located inside of a room 12 of a building. A fire 92 has started on top of a stand 94 in the room 12, and smoke 14 is produced from the fire 92 and has risen to the ceiling 18 of the room 12. Depending upon the pattern of air flow in the room 12, the smoke 14 may or may not flow onto the ceiling 18, and may or may not cover all of the ceiling 18. However, it is generally the case that the smoke 14 from a fire 92 will rise and cover some portion of the ceiling 18 and will generally be at the highest portion of the room 12. The fire detection device 10 is placed on the upper surface of a table 16 that is located inside of the room 12. The fire detection device 10 has a light source 24 that emits a light 28 upwards to hit the ceiling 18. The light 28 will illuminate the smoke 14 as it shines through the smoke 14 to cause particles in the smoke 14 such as soot and ash to be better visible to the camera 22 of the fire detection device 10. The camera 22 has a field of view 26 that is likewise directed to the ceiling 18 of the room 12 and can more easily capture an image of the smoke 14 due to illumination by the light 28. It is therefore the case that the light 28 can be located within the field of view 26 of the camera 22, and that both the light 28 and field of view 26 are directed upwards to the ceiling 18. However, it is to be understood that in accordance with other exemplary embodiments that the light 28 and the field of view 26 need not be directed onto the ceiling 18. For example, in some arrangements of the fire detection device 10, these elements 28 and 26 may be directed to a wall of the room 12, or to the floor of the room 12, object in the room 12, to a window of the room 12, or to some combination of the ceiling 18, floor, wall, object or window.

The camera 22 may be arranged close to the light source 24 so that there is very little distance between the portion of the light source 24 from which the light 28 emanates and the portion of the camera 22 from which the field of view 26 emanates. The distance between these two portions may be from 0.1 to 0.4 centimeters, from 0.4 to 0.8 centimeters, from 0.8 to 2.0 centimeters, from 2.0 to 2.5 centimeters, from 2.5 to 3.0 centimeters, or up to 10 centimeters. In other exemplary embodiments, the distance may be up to 20 centimeters, up to 50 centimeters, or up to 1000 centimeters. The camera 22 and light source 24 may be arranged so that no distance is between them such that a single device provides both of their functionality. The camera 22 may be arranged so that the field of view 26 and the light 28 overlap at some point either during the entire sequence of measurement, or during a portion of the measuring sequence of the device 10. Positioning of the camera 22 and the light source 24 close to one another may reduce or eliminate the presence of shadows that the smoke 14 may cast onto the ceiling 18. Close positioning of these components may cause the smoke 14 to be more brightly illuminated by the light 28 so that the camera 22 can pick up the presence of the smoke 14 as a bright image without the presence of, or minimization of, shadows and darkness caused by the smoke 14. It is to be understood that as used herein the term "smoke" 14 is broad enough to include ash, soot, burning debris, and any other byproduct of combustion caused by a fire 92. The fire 92 may include any type of flame, including a flameless fire such as a smoldering fire that does not necessarily have flame visible but that does create smoke 14.

Figure 2:
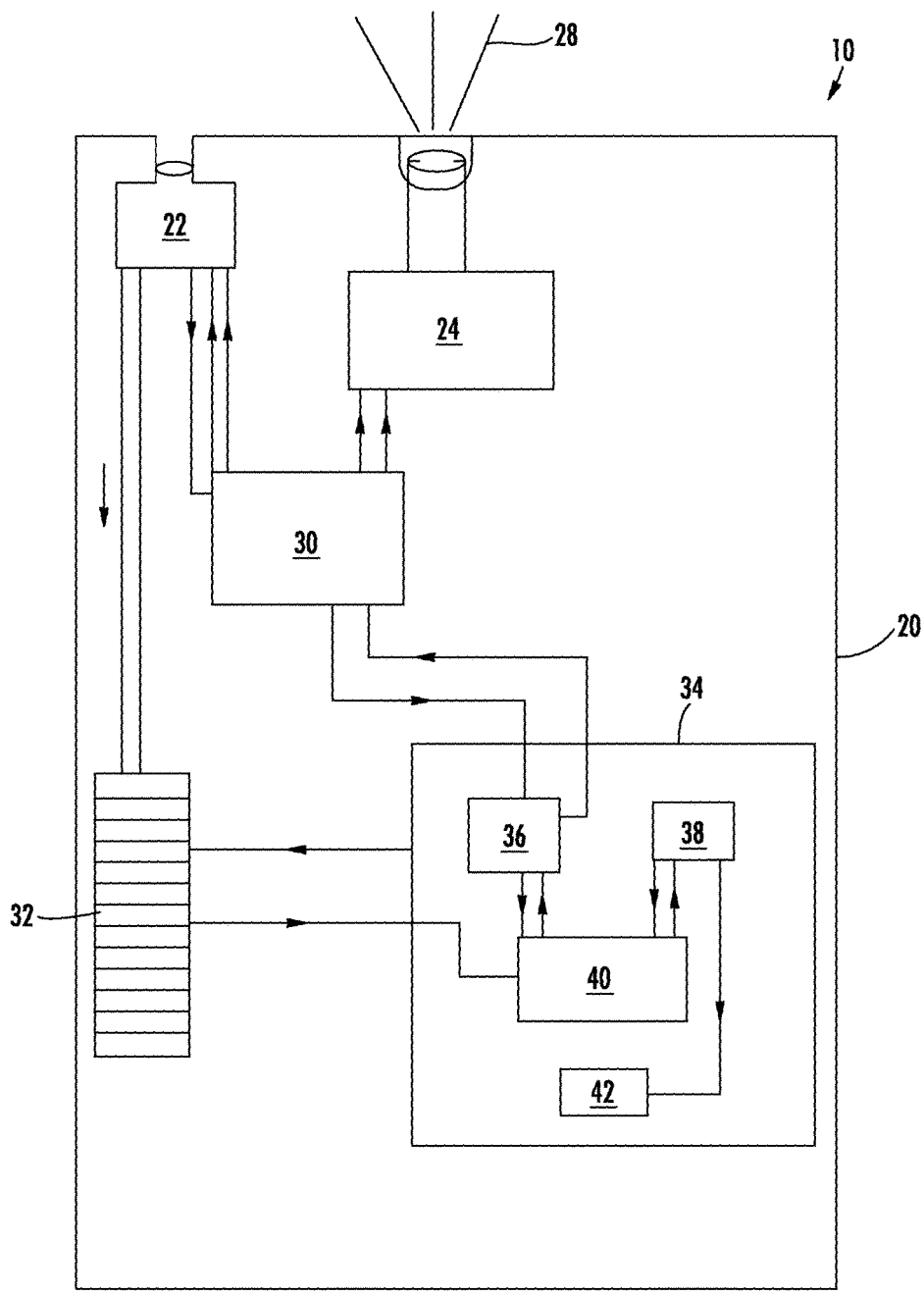
FIG. 2 is a schematic view of a fire detection device in accordance with one exemplary embodiment.

FIG. 2 shows the fire detection device 10 in greater detail. The fire detection device 10 may include a housing 20 into which various components of the fire detection device 10 are housed. All of the components of the fire detection device 10 may be inside of the housing 20, or some of the components may be inside of the housing 20 while other components are located remote from the housing 20 and are not carried by, and do not engage the housing 20. A light source 24 may be included and may be capable of generating a light 28 that is made of a single beam or multiple beams. The light source 24 may be a flash on a camera in accordance with certain exemplary embodiments, and may be a flash or light on a smart phone in some arrangements of the fire detection device 10. The light source 24 is arranged so that the light 28 is not blocked by the housing 20, and portions of the light source 24 may extend through an aperture of the housing 20 or the entire light source may be located outside of the housing 20 and not covered by the housing 20.

A camera 22 is carried by the housing 20 and may likewise be completely located outside of the housing 20, completely inside of the housing 20, or partially inside and outside of the housing 20. The camera 22 may be completely inside of the housing 20, and a lens of the camera 22 may receive light from outside of the housing 20 via an aperture that extends through the housing 20. An internal timer and control 30 may be in communication with both the camera 22 and the light source 24 in order to send instructions to both in order to tell both when and how to actuate. For example, the light source 24 may be instructed to flash one or more times in sequence and the intensity and length of each of the flashes may be ordered by the internal timer and control 30. In a similar manner, the camera 22 may be instructed by the internal timer and control 30 as to when to capture an image, whether to focus or not focus, what shutter speed to use, whether to take a color or black and white image, and whether to take video footage or still images. The camera 22 may be instructed by the internal timer and control 30 to manipulate the flash intensity of the light source 24 so that the device 10 may function in a dark room without producing too much light that would be a nuisance to someone trying to sleep. The flash intensity could also be varied or controlled in other situations as needed or desired by the device 10. The internal timer and control 30 may be capable of instructing the camera 22 and the light source 24 to record an image that is illuminated when the light source 24 lights so that the picture is timed with the flash. Information or instructions from the camera 22 may be communicated to the internal timer and control 30. The fire detection device 10 may thus be capable of adjusting the shutter speed, image focusing, light to flash, and other variables associated with the camera 22.

The fire detection device 10 may also include an internal image memory 32 that receives information from the camera 22. The image data may be completely digital in certain exemplary embodiments such that no analog image data is received or used at all by the fire detection device 10 at any point from the light entering the lens of the camera 22 onward. The image data can be stored in the internal image memory 32 and may be transferred to a processor 34 of the fire detection device 10. In a similar manner, the processor 34 may communicate with the internal image memory 32 in order to instruct the internal image memory 32 to do certain things such as sending or removing data within the internal image memory 32.

The processor 34 may have various modules that perform different functions. For example, the processor 34 may have a camera and flash module 36 that sends information to and receives information from the internal timer and control 30. The camera and flash module 36 may be part of an algorithm that controls the fire detection device 10 and causes it to function to detect the fire 92. The camera and flash module 36 may send signals to the internal timer and control 30 to cause it to generate light 28 and the camera 22 to capture the image. Likewise, particulars about the light 28 and the camera 22 can be sent to the camera and flash module 36 via the internal timer and control 30 to inform the module 36 when pictures are being taken and when the light 28 is being emitted.

The processor 34 may also include an image comparator module 40 that can receive information from the internal image memory 32 that can compare the different images to one another or to a reference image. These comparisons can be sent to an image analyzer module 38 that can analyze the various comparisons in order to determine if a fire 92 is taking place or is not taking place. The image comparator 40 may send and receive information to and from the camera and flash module 36 and the image analyzer 38. If the image analyzer module 38 determines that a fire 92 is taking place, the image analyzer module 38 may send a command to an alarm module 42 that in turn causes an alarm to be generated by the fire detection device 10. The alarm may be a sound or auditory alarm, a vibration alarm, or a visual alarm, or may include any combination of the three. Additional alarm types are possible in other exemplary embodiments, and the fire detection device 10 can generate any type of alarm for informing the user that a fire 92 is taking place. For example, the alarm can be the sending of a message, such as a telephone call, text message, email, or other message, to a 911 emergency center, a fire department, a hotel front desk, or a monitoring service associated with the device. The alarm module 42 need not be present in other arrangements. Instead, the image analyzer module 38 of the processor 34 may cause the alarm to be directly generated such that the fire detection module 10 makes a sound, vibration, and/or visual warning to signal an alert of a fire 92.

The camera 22 may be a digital camera that directly samples the original light that bounces off of the subject of interest (smoke 14 or ceiling 18) and that breaks the sampled light down into a series of pixel values. The light 28 is used to illuminate the smoke 14 to image the smoke 14, and the light 28 itself is not analyzed as a beam. The digital camera 22 may include a series of photosites (pixels) that each detect the amount of incident light (number of incident photons) and store that as one electron charge per detected photon. The amount of charge in each pixel is subsequently converted into a proportional digital count, such as by an A-to-D converter. The number of photons of light that are imparted onto each photosite thus may be counted and this number may in turn be used to represent the intensity of the light striking that particular photosite. In this manner, the amount of light striking each pixel element on the surface of the camera 22 can be measured and analyzed. In this application, we refer to the camera digital output generally as "photons", "photon count", "light intensity", or "digital count" interchangeably.

With reference now to FIG. 3, a pixel array 66 of the camera 22 is shown in which twelve pixels are illustrated. In reality, the pixel array 66 can be composed of millions of pixels and thus it is to be understood that the pixel array 66 illustrated is greatly simplified for sake of discussion relative to the fire detection device 10.

The camera 22 may be, for example, an 8-bit device in which light intensity values are digitized from 0-255. Alternatively, the camera may have 12-bit or greater precision, or may be a color camera producing, for example, 24-bit RGB data. For purposes of illustration, 8-bit data is assumed. A digital count of 20 may correspond to a few hundred photons. A light intensity of 21 is higher than a light intensity of 20 and thus represents more photons than a light intensity of 20. It is to be understood that the numbers used herein are only exemplary in describing one or more embodiments of the device 10. The first pixel 68 is shown as having a light intensity of 20. In other words the photons captured by the first pixel 68 in the image obtained by the camera 22 are represented by a digital count of 20. As stated, it may be the case that several hundred photons were in reality captured to produce the count "20." The number 20 is simply used for sake of convenience and in accordance with standard optical practices in some known devices. The second pixel 70 is located next to the first pixel 68 and in this example has a light intensity of 10, which also is the number of photons captured by the second pixel 70 when obtaining the image. The additional pixels are designated as the third pixel 72, fourth pixel 74, fifth pixel 76, sixth pixel 78, seventh pixel 80, eighth pixel 82, ninth pixel 84, tenth pixel 86, eleventh pixel 88, and twelfth pixel 90 and all likewise have a particular light intensity measurement value that is shown within their respective boundaries. Again, as previously stated the actual number of photons may be of course greater than 10, 40, 70, etc., but are listed as being these numbers for sake of example, and in accordance with optical imaging standards. The fire detection device 10 may capture an image and designate this image as a reference image. The pixel array 66 of FIG. 3 may be an example of the reference image captured by the fire detection device 10. As previously mentioned the image comparator module 40 may obtain this image and designate it as the reference image.

The camera and flash module 36 may cause the internal timer and control 30 to obtain another image by actuating the camera 22 and the light source 24 at some point in time after the reference image is obtained. This time may be from 1 to 3 seconds, from 3 to 6 seconds, from 6 to 10 seconds, or up to 1 minute of time. FIG. 4 shows the photo array 66 of FIG. 3 some amount of time after the reference image of FIG. 3. The photo array 66 of FIG. 4 may be identified as a measured image. The image that is measured at the measured image may be different in some respects from the image that is measured in the reference image. As shown in FIG. 4, the image has changed in that the first pixel 68 now has a measured light intensity of 10 instead of 20 from that in FIG. 3. As a fewer number of photons have been captured by the first pixel 68 during this image, it means that the image is darker in this portion in the measured image than in the reference image. The second pixel 70 has a measured value of 10 which is the same as that of the second pixel 70 in the reference image of FIG. 3, and this signifies the fact that the image has not changed at all between the reference and measured images at the second pixel 70.

Other pixels in the measured image of FIG. 4 show an increase in light intensity that signifies the image is brighter at those pixels in the measured image than in the reference image. For example, the seventh pixel 80 went from an intensity of 100 to 150, and the twelfth pixel 90 went from an intensity of 130 to 200. FIG. 5 shows a difference image in which the pixel array 66 is again displayed. The difference image may be an image generated by the fire detection device 10, or may simply be a computation of a portion of the fire detection device 10 such as the by the image analyzer 38. The difference image of FIG. 5 shows the light intensity of each pixel that is calculated by taking the measured light intensity of that particular pixel minus the reference light intensity of the same pixel. For example, the first pixel 68 has a difference value of −10 because the first pixel 68 went from a reference value of 20 to a measured value of 10. The seventh pixel 80 has a difference value of 50 (150−100), and the twelfth pixel 90 has a difference value of 70 (200−130). The various differences in all 12 pixels are shown in FIG. 5, and this difference image, if displayed by the fire detection device 10, can be arranged so that positive difference values are white and negative difference values are black. The difference image can be displayed such that if the difference is positive, the pixel in question is white, and if the difference is negative the pixel is black regardless of the intensity level. In other arrangements, the pixel can be displayed darker or lighter based on the measured intensity level of the pixel in question.

The previously described assignment may include a camera 22 and array 66 that is black and white. The setting of the camera 22 may be a black and white setting, or the camera 22 may only be capable of obtaining black and white photographs. In other arrangements, the images captured by the camera 22 can be color images. Here, red, blue, and green components can be captured and held in the pixel array 66. The color or RGB image can be converted by an algorithm into a luminance image and processed in a similar manner as described with respect to the black and white capturing and processing method.

As shown in FIG. 5, some of the differences are positive, some negative, and some unchanged between the reference image and the measured image. Changes that denote an identifiable change in the image are generally clustered around a set of pixels that are contiguous or at least close to one another. For example, the seventh pixel 80, eighth pixel 82, eleventh pixel 88, and twelfth pixel 90 all show significant brightness in the measured image as compared to the reference image. These pixels 80, 82, 88 and 90 are all contiguous or at least close to one another. The significant increases in these close/contiguous pixels 80, 82, 88 and 90 may indicate that a bright item, such as smoke 14, is detected. When smoke 14 is detected the alarm may sound because the fire detection device 10 associates the presence of smoke 14 with the presence of fire 92.

The fire detection device 10 may be arranged to detect the presence of smoke 14 by only using the intensity of light imparted onto the pixel array 66, and not color that is perceived by the camera 22 or any other part of the fire detection device 10 such as the processor 34 or the internal image memory 32. However, it is to be understood that the analysis as to whether smoke 14 is or is not present may in fact include consideration of the color information obtained from the observed image.

Figure 6:
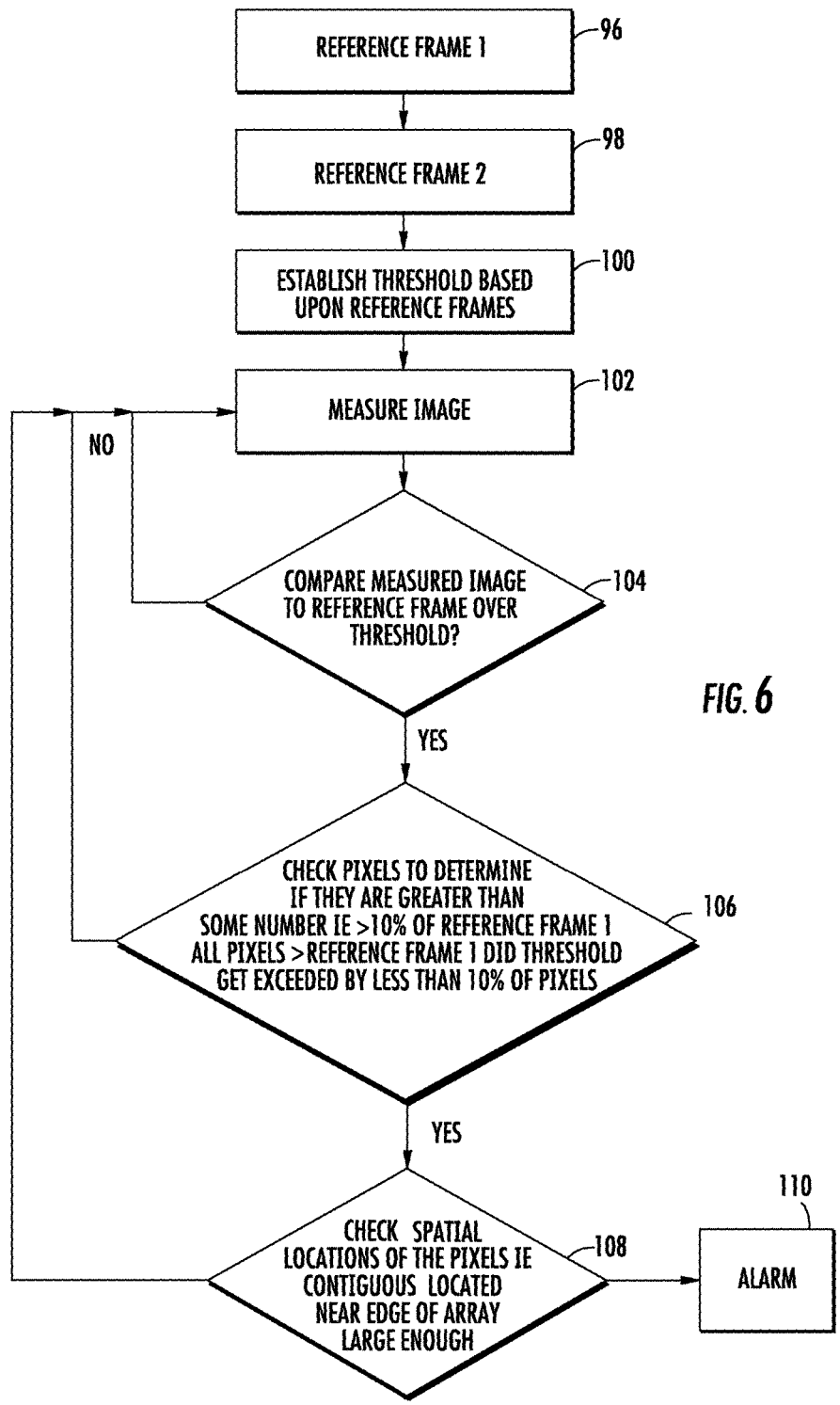
FIG. 6 is a flow chart showing how the fire detection device detects a fire in accordance with one exemplary embodiment.

FIG. 6 shows one embodiment of an analysis of the fire detection system 10 that can be used in order to ascertain the presence of smoke 14 or flames from a fire 92. The analysis may be an algorithm that is executed by the processor 34, or a combination of different processors. The analysis first commences with the establishment of a threshold that is based upon the measurement of one or more reference frames. Even if the image does not change, the camera 22 may not register the same intensity on all of the pixels in the pixel array 66 as successive images are taken. This is because vibrations on the table 16, temperature changes, and camera 22 properties all function to create noise in the image capture process. For instance, the camera 22 may have an autofocus, or other mechanical processes, that causes movement and hence variation in brightness observed in the same image between successive frames. As such, it is expected that there will be some naturally occurring noise in the system and the fire detection device 10 may be arranged to alert taking the presence of this noise into account. The autofocus may be turned off in certain arrangements so that the analysis is performed without the image taken by the camera 22 in focus. In other arrangements, the image may in fact be in focus, and the autofocus feature of the camera 22 may be used. Even beyond these reasons for variation, the camera 22 may not register the same intensity on all of the pixels in the pixel array 66 from successive images taken because any photon counting process is inherently a stochastic process and the values may be different from successive images even without any scene change between successive images.

In step 96, a first reference frame 1 is taken by the camera 22. A second reference frame 2 some amount of time later may then be taken by camera 22 at step 98. The comparison function previously described between the pixel arrays 66 of the first and second reference frames may be conducted at analysis step 100. The difference between the frames can be calculated as a total difference in intensity between the first and second reference frames. As such, the total number of photons from the first frame can be subtracted from the total number of photons from the second reference frame to arrive at this difference. Given the nature of the photon counting detection device, the distribution of each pixel in the pixel array 66 would be considered to be Poisson. The differences between each pixel from the first to the second reference frame would be distributed as a Skellam distribution. It is to be understood, however, that this distribution need not be a Skellam distribution in other arrangements. For instance, if a fan or some other movement were within the field of view 26, a Skellam distribution would not be expected. The distribution of pixels in these cases may be estimated empirically by using a few images in which the assumption is made that the scene is stable. This estimated distribution may be used instead.

From this step 100, the threshold could be set up beyond which a likelihood of observing a pixel difference is low. In one example, for instance, the reference threshold frame 1 photon count at step 96 may be 1 million photons, and the reference threshold frame 2 photon count at step 98 may be 1.2 million photons and the difference may be 0.2 million photons. The threshold in step 100 may be established at 1.5 million photons based upon analysis of the reference threshold frames, in which the difference was 0.2 million photons and the threshold is established as 0.3 million photons thus meaning the threshold is 1.5 million photons from the frame 2 reference frame. Although described as taking only two reference threshold frames, it is to be understood that this is only for sake of example and that multiple reference frames can be measured and used in arriving at the threshold set at step 100. The threshold may be the same for the entire time the fire detection device 10 functions upon start up, or the threshold may be adjusted by taking different reference frame measurements to result in the establishment of new thresholds at different times through the process.

The process may then move onto step 102 in which a measured image is captured. The camera 22 can take a measurement image of the ceiling 18 or other area of the room 12. The successive measurements may be taken every second, every two seconds, or every three seconds. In other arrangements, from 3-5, from 5-30, or up to 120 seconds may take place between successive measurements. Once a measured image is captured by the camera 22, at the next step 104 the measured image is compared to a previous reference image. The reference image may be the one taken in reference frame 1, or may be a reference image that is updated at various intervals through the measurement process. For example, the reference frame can be updated every 5 minutes, every 10 minutes, or every 15 minutes as the fire detection system 10 functions. The reference image may be the same image as the reference frame 1 image, or may be the same image as the reference frame 2 image in accordance with certain embodiments.

The comparison at step 104 may be performed in the manner previously discussed with reference to FIGS. 3-5 in which the total number of photons of the pixels that are different are determined. For instance, the reference frame may have 1 million photons and the measured image may have 1.6 million. The difference is 0.6 million photons which is greater than the established threshold of 0.3 million photons (or total number of 1.5 million photons).

The presence of smoke 14 may cause the image to be brighter and hence additional photons will be present when smoke 14 is present. The smoke 14 may cast a shadow onto the ceiling 18, and cause dark areas and hence fewer photons, but the close placement of the camera 22 to the light source 24 may minimize or eliminate the presence of shadows cast by the smoke 14. The evaluation may only look towards an increase in the number of photons between the measured and reference images and may ignore any decreases. However, it is to be understood that both increases, decreases, and no changes are considered in accordance with various exemplary embodiments.

Figure 8:
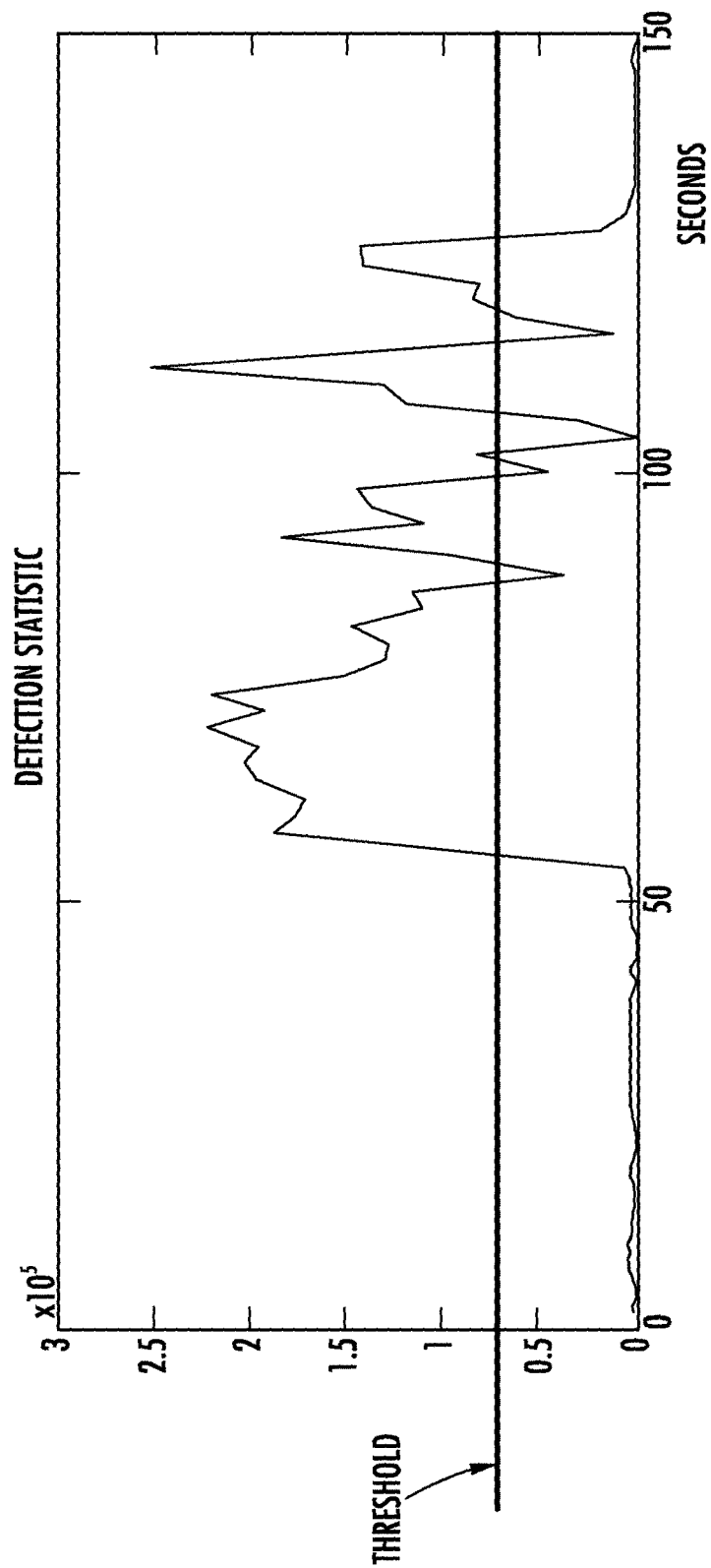
FIG. 8 is a plot of the differences detected between the measured image and the reference image taken over time in accordance with one exemplary embodiment.

The output of the image comparator 40 and image analyzer 38 modules will be a detection statistic, as shown in FIG. 8. This may be as simple as the summed pixel values of the difference image, or a more robust index such as the (a) root-mean-square difference (RMSD), (b) summed absolute values of differences, or (c) a more complex measure that includes the number of contiguous pixels above threshold in the difference image, or the RMSD of contiguous pixels that deviate up or down by more than a threshold value in the difference image. The detection statistic can be calculated in a variety of manners in accordance with different exemplary embodiments, and some of these manners are described in this application at other portions of the application.

FIG. 8 shows a plot of the detection statistic that in this embodiment is the difference between the number of photons in the measured image minus the number of photons in the reference image on the Y-axis versus time on the X-axis. In the example illustrated in FIG. 8, the threshold is set at approximately 60,000 photons which is the difference between the measured minus the reference. Continuous measurement occurs as time increases on the X-axis in which the difference between the total number of photons in the measured image minus the total number of photons in the reference image is plotted. As shown, at around 52 seconds of time, the detection statistic crosses over the established threshold. The analysis at this point may then move onto additional comparisons as will be momentarily discussed in order to determine whether to sound the alarm. It is to be understood that the plot of FIG. 8 need not be generated or displayed during the running of the fire detection system 10 in certain embodiments.

With reference back to FIG. 6, if the threshold is not exceeded in step 104, the process moves back to step 102 and the next image is measured and then subsequently reevaluated in step 104. If the threshold is in fact exceeded in step 104, the system moves on to step 106 in which the pixels of the pixel array 66 are checked in order to determine if they are greater than some number. For example, the system may determine whether 10% or more of the pixels in the measured image have an intensity that is greater than their respective intensities in the reference frame 1. This calculation will be on a pixel by pixel basis and will not be a composite comparison of the intensity of all of the pixels in frame 1 verses all of the pixels in the measured image. Additionally or alternatively, the system may at step 106 determine whether all of the pixels in the measured image have a greater intensity than they did in the reference frame 1. Additionally or alternatively the system may measure at step 106 whether the threshold was exceeded by 10% or fewer of the pixels of the pixel array 66. All three or one of, or any combination of the aforementioned measurements may be taken at step 106 in order to determine whether the pixels are greater than some number. It is to be understood that the percentages mentioned are only exemplary and that others are possible in accordance with other exemplary embodiments.

Although not shown in the flow chart, an additional step may be present at this point of the process. This additional step may involve the camera 22 capturing additional reference frames at a faster pace, that is at shorter intervals of time between frames, than what was captured in the earlier steps 96 and 98. These additional frame captures at shorter time intervals may give additional measurements with which to do more calculations for more precise results. The additional measurements may be used to validate the previously described check at step 106, and if validated the method may go on to step 108. If not validated, the method may be back to step 102. As previously stated, this additional step may be optional and need not be present in other arrangements of the device 10.

If the analysis determines at step 106 that the pixels are not greater than some number, the analysis moves back to step 102. However, if the limit that was established in step 106 is in fact exceeded the process moves on to step 108. Here, location considerations of the pixels from step 106 are taken into account. The location considerations are based upon which specific pixels of the pixel array 66 are identified in step 106. In step 108 the processor 34 may determine whether the pixels identified are contiguous or are spuriously spaced and thus separate from one another. This determination may function to help the device 10 decide whether smoke 14 is present because the identified pixels may be touching if smoke 14 is present and may not be touching if it is not present. In some arrangements, the processor 34 may determine whether greater than fifty percent of the pixels that have increased photon intensity are contiguous. In this regard, greater than 50 percent of the identified pixels are immediately adjacent another identified pixel. In other embodiments, the number may be 60 percent, 70 percent, or up to 90 percent.

Figure 11:
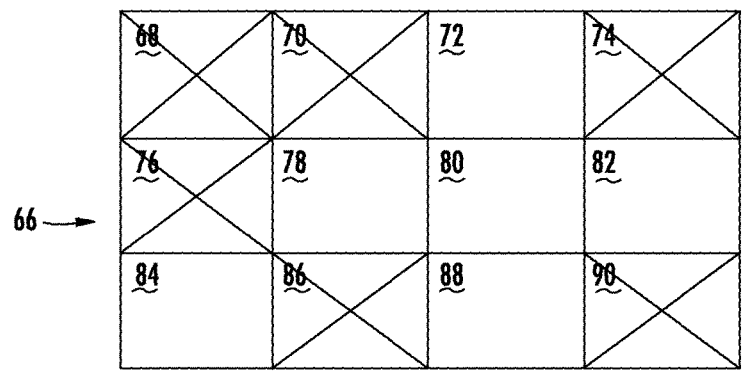
FIG. 11 is a pixel array that shows pixels that are identified and pixels that are not identified.

With reference now to FIG. 11, a pixel array 66 is illustrated in which six of the pixels are identified pixels, and thus are identified as having increased photon intensity. These six pixels are the first pixel 68, the second pixel 70, the fourth pixel 74, the fifth pixel 76, the tenth pixel 86, and the twelfth pixel 90. The first pixel 68, second pixel 70 and fifth pixel 76 are all contiguous because both the second pixel 70 and the fifth pixel 76 border on and engage the first pixel 68. However, the fourth pixel 74 and the twelfth pixel 90 are not contiguous because there are not pixels that are located immediately adjacent them that are likewise designated as identified pixels. The tenth pixel 86 may contiguous in some exemplary embodiments because it is located diagonally across from the fifth pixel 76 and thus may be referred to as contiguous. However, in other embodiments of the system the tenth pixel 86 is not contiguous because the spatial orientation of the tenth pixel 86 is diagonally arranged with respect to the fifth pixel 76 and this is not considered to be contiguous.

Additionally or alternatively, the system at step 108 may seek to determine whether the identified pixels are near the edges of the pixel array 66. This may be indicative of smoke 14 invading the field of view 26 of the camera 22 because smoke 14 will first appear at the edges of the pixel array 66 and not at the center of the pixel array 66. This determination may signify whether a "cloud" of smoke 14 is moving into the field of view 26 from a corner or edge. Still additionally or alternatively in step 108, the processor 34 in step 108 may seek to determine whether the number of identified pixels is large enough. Here, it may be necessary for the pixels that are identified in step 106 to fill in a certain sized area of the pixel array 66, and if they do not then this space requirement of the analysis is not met. In some arrangements, the system may determine whether all or a majority of the identified pixels are located in a region of the pixel array 66 that includes half of the pixels of the pixel array 66 that are farthest from the center of the pixel array 66. In other words, the pixels that are farthest from the center of the pixel array 66 are not the fifty percent of pixels that are closest to the center. If the pixel array 66 is rectangular, the fifty percent of closest pixels may be shaped as a rectangle with the center of the pixel array 66 at its center. The fifty percent of pixels farthest from the center may form a picture frame like border about the pixels that are included as the ones in the closest fifty percent. If all, 75% or greater, 65% or greater, 50% or greater, or 35% or greater of the identified pixels fall within the fifty percent of pixels spatially located farthest from the center of the pixel array 66, the system may determine that the space analysis is confirmed for smoke 14.

Figure 12:
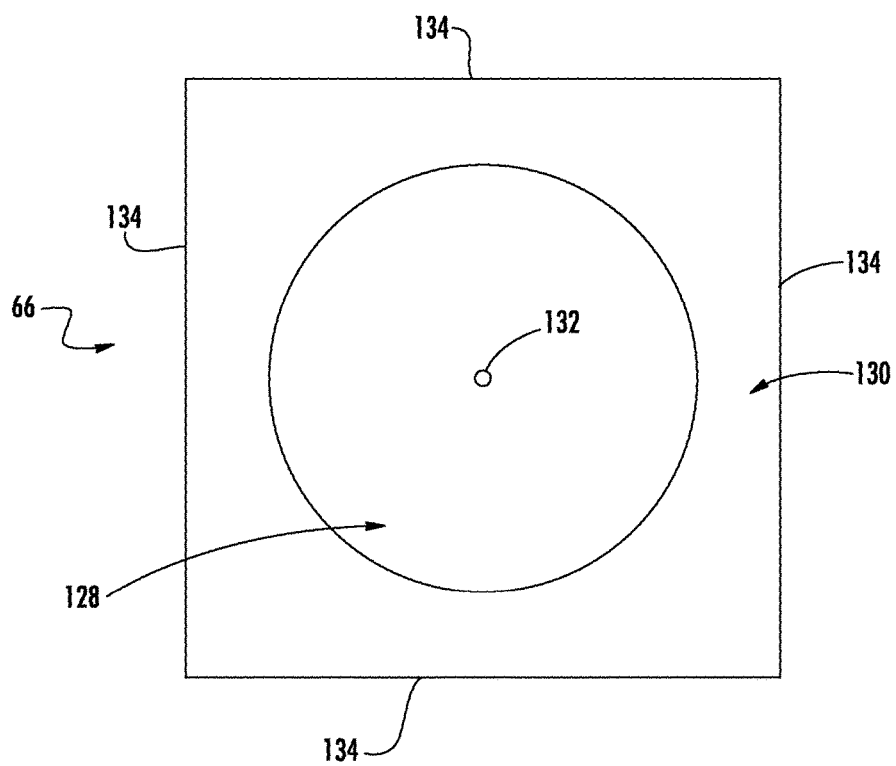
FIG. 12 is a pixel array that shows an area in which fifty percent of the pixels are located that are closer to the center than an area in which the other fifty percent of the pixels are located.

FIG. 12 shows a pixel array 66 but leaves out the pixels for sake of clarity. The pixel array 66 is square shaped, and the pixels may likewise each be in the shape of a square. A center 132 of the pixel array 66 is noted, along with all four of the edges 134 which make up the outer boundary of the entire pixel array 66. A center area 128 of the pixel array 66 is the area in which fifty percent of the pixels of the pixel array 66 are closest to the center 132. This center area 128 may be circular in shape. An outer area 130 of the pixel array includes fifty percent of the pixels of the pixel array that are farthest from the center 132 along any radius from center 132. All pixels in the outer area 130 are more distant along any radius from the center 132 than any pixel in center area 128. The outer area 130 includes the pixels of the pixel array 66 that are generally closest to the edges 134. In some exemplary embodiments, the system may determine whether some number of the identified pixels are in the outer area 130, and if so may cause the space requirement of the system to be met. This number may be 100%, 90%, 80%, 50%, or from 50%-85% in certain exemplary embodiments. Alternately, the system may look at the number of identified pixels that are in the center area 128 and may use this information to determine whether the space requirements of the system are or are not met.

The space analysis in step 108 may employ one, two or any combination of the aforementioned comparisons in order to determine whether the space requirements are met. If this is the case the process will move on to step 110 in which an alarm is triggered to alert the user that smoke 14 is present and thus a fire 92 is present. If the space evaluation of the identified pixels is not determined to be in the affirmative, then the system realizes that no smoke 14 is present and moves once again back to step 102 to continue capturing measurement images. The fire detection device 10 will function for a preset time, or until it is turned off by the user.

Figure 7:
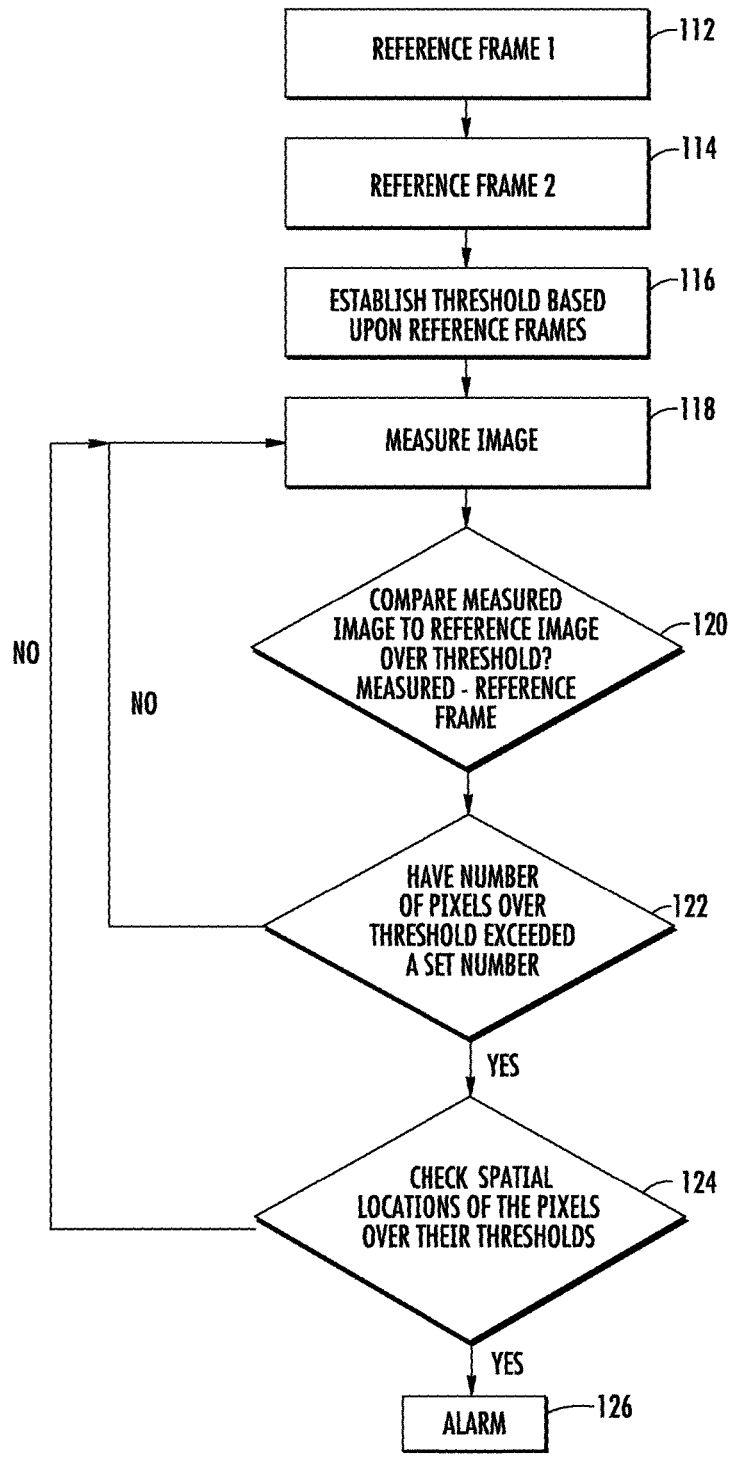
FIG. 7 is a flow chart showing how the fire detection device detects a fire in accordance with a different exemplary embodiment.

The analysis may be different in accordance with other exemplary embodiments of the fire detection device 10. FIG. 7 shows a different analysis of the fire detection device 10 for detecting smoke 14 and fire 92. The analysis starts at step 112 in which a reference frame is taken. Here, the intensity of each pixel of the pixel array 66 is individually measured. For instance, the first pixel 68 may be measured as being 20 photons, the second pixel 70 as being 10 photons, and so on. At step 114, a second reference frame 2 is taken and the same pixels 68 and 70 are again measured. Here, pixel 68 may be 22 photons, and the second pixel 70 may be 12 photons. The remaining individual pixels of the pixel array 66 are likewise measured at the second reference frame 2.

Moving on to step 116, the threshold is established by setting a threshold for each individual pixel of the pixel array 66. This threshold may be set by any statistical process, such as those previously described with respect to steps 96, 98, 100 above. For instance, the threshold for the first pixel 68 may be set at 24 photons based upon a statistical analysis of the levels between the first and second reference frames. The additional pixels of the pixel array 66 may likewise have their own thresholds set which may be different than the threshold of the first pixel 68. The threshold of the second pixel 70 may be 13.

The system may move on to the next step 118 after establishing the thresholds and take images in sequential fashion as the fire detection device 10 continuously monitors the room 12. The timing between successive images may be performed as previously discussed. The system analyzes the measured image at step 120 in which the measured pixel is compared to a reference pixel. The reference pixel may be the intensity of the first pixel 68 at the reference frame in step 112 or 114, or may be a reference pixel that is measured at various timing points through the monitoring. At the comparison step 120 the intensity of the first pixel 68 of the measured image is subtracted from the intensity of the first pixel 68 at the reference image and this difference is compared to the threshold of the first pixel 68 established at the threshold step 116. For instance, if the threshold is 24 photons and the intensity is measured as being 25 photons then the threshold is exceeded and the first pixel 68 is identified as having an exceeded threshold at step 120. The second pixel 70 may be measured as having an intensity of 15 and this number may be above the threshold of 13 that was previously set for the second pixel 70. All of the pixels of the pixel array 66 may be similarly evaluated at step 120 to determine which ones are above their threshold.

The process may then move to step 122 in which a determination is made as to whether the number or percentage of pixels that have exceeded their threshold is above some set number or percentage. For example, the set number may be 40,000 pixels, or may be set at 10%. The set number or percentage may be established independently from the threshold calculation at step 116, or may be established based in whole or in part on the values established at the threshold step 116. The number may be selected as being anywhere from 30,000 to 100,000 pixels, from 100,000 to 500,000 pixels, from 500,000 to 2,000,000 pixels, or up to 5,000,000 pixels. It is to be understood that the aforementioned numbers of pixels are only exemplary and that others can be used in accordance with different exemplary embodiments. If this number/percentage is not exceeded at step 122 then the system moves back to step 118 to continue taking image measurements. If the number/percentage set for the pixels has in fact been exceeded then the process moves on to step 124.

At step 124, the pixels that were determined to be over their respective thresholds at step 120 are evaluated in order to ascertain location and spacing information. This analysis would be the same as described above with respect to step 108 in that the number of the pixels, whether they are contiguous, and whether they do or do not emanate from an edge or corner of the pixel array 66 is looked at to determine if the pixels are indicative of smoke 14 or fire 92. If the pixels that are over their thresholds do satisfy space or size requirements then the system triggers the alarm at step 126. If not, then the system moves back to step 118 for continued monitoring. Again, one or any combination of the various space considerations can be taken into account to determine whether the space requirements at step 124 are met.

It is to be understood that the previously described methods of analysis can be modified in other embodiments. For example, the space requirements in steps 108 and 124 can be eliminated in some arrangements. In other embodiments, the comparison steps 104 and 120 may compare only the top 10% of pixels based upon their photon count so that the 90% of pixels in the image that have the lowest pixel count would not be evaluated at all. This top 10% of pixels would be the ones identified as being the top 10% in the measurement steps 102 and 118.

The previous arrangements have been described with detection of smoke 14 associated with additional photons being detected by the pixel array 66. However, the photons associated with smoke 14 detection need not always be in the positive, or addition of photons, but could be associated with the removal of photons. For example, shadows cast by the smoke 14 onto the ceiling 18 or other surfaces, or the presence of black smoke may cause the image that is measured to be darker than the reference image, and hence fewer photons detected by the fire detection device 10. In this regard, the fire detection device 10 may also have an analysis that looks for the loss of photons in basically the same manners as previously discussed with respect to the increase in photons. The thresholds mentioned may include an upper level and a lower level. The upper level may be associated with an increase in brightness of the pixel, and the lower level is associated with a decrease in brightness of the pixel. If the pixel of the measured image has an intensity higher than the upper level, then the threshold is exceeded. Likewise, if the pixel of the measured image has an intensity lower than the lower level, then the threshold is exceeded. The threshold as described herein may thus have upper and lower limits so that if the measured image is outside of these limits, the threshold is deemed exceeded. Still further, or alternatively, the fire detection device 10 can be arranged so that it looks for changes in the absolute values of photons in the measured images with respect to the reference image. The use of absolute values may be able to take into account both increases and decreases of light intensity caused by the smoke 14. Also, the analysis when using absolute values can be similar to those described above that look for brightness in the measured image versus the reference image.

However, although described as taking all positive and negative changes of the photons into account when seeking to identify smoke 14, some arrangements of the fire detection device 10 only take positive changes into account. In this regard, any negative change between the reference frame and the measurement frame is ignored and plays no part into whether the analysis does or does not detect smoke 14. Only positive changes count. The positive changes are associated with an increase in photons from the reference frame to the measurement frame and thus only an increase in brightness is looked at to determine whether smoke 14 is or is not present. The thresholds in these arrangements may thus have only an upper limit, since a decrease in photon count would be ignored anyway.

Figure 9:
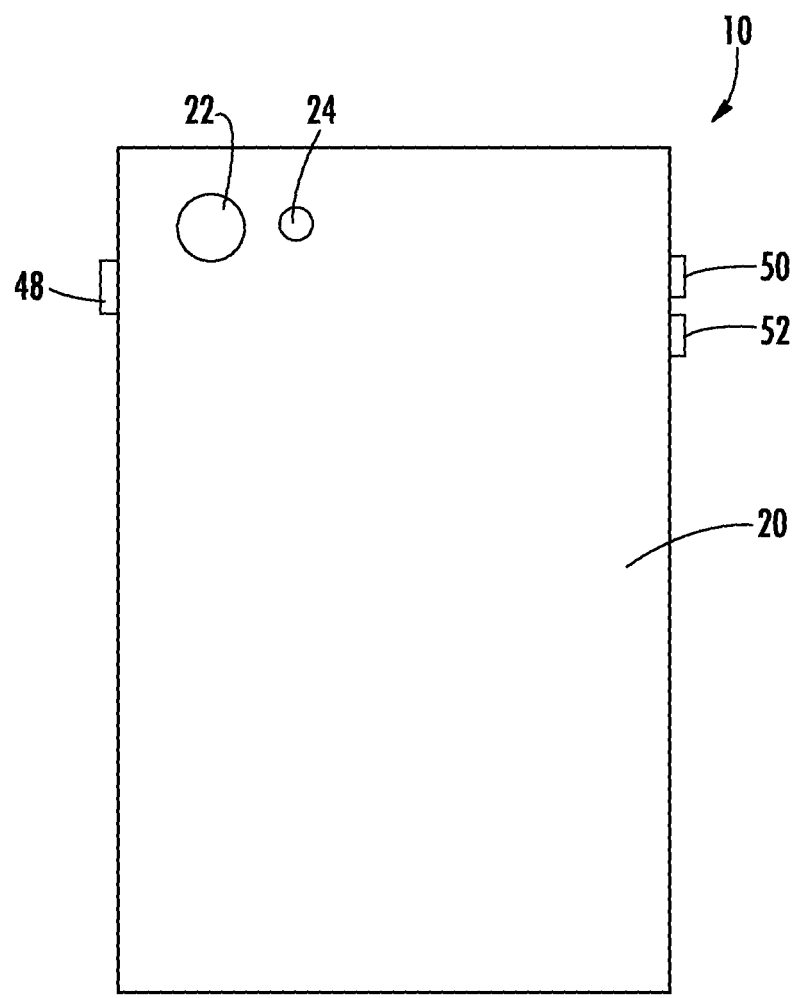
FIG. 9 is a back plan view of a fire detection device as incorporated into a smart phone.

The fire detection device 10 can be a stand-alone device in that the device functions to detect smoke 14 and fire 92 but does not perform any other functions. Alternatively, the fire detection device 10 may be incorporated into another device that is capable of performing other functions. For example, the fire detection device 10 may be incorporated into a cell phone, smart phone, personal digital assistant, or laptop computer. With reference now to FIG. 9, the back surface of a fire detection device 10 is shown that is incorporated into a smart phone. The smart phone has a housing 20 that may be a case into which the smart phone is stored, or may simply be the original housing provided with the smart phone. The processor 34 can be a processor of the smart phone, or may be a processor of a computer remote from the smart phone. The camera 22 and the light source 24 of the smart phone are shown, and may be the camera 22 and the light source 24 that is used by the fire detection device 10 when monitoring for smoke 14. The smart phone is placed onto the upper surface of the table 16 so that the camera 22 and the light source 24 are directed upwards to the ceiling 18 and so that the screen 44 of the smart phone is blocked from view by being positioned facing the upper surface of the table 16 onto which the smart phone is placed. The smart phone may include volume buttons 50 and 52, and a power button 48 for turning the smart phone on and off.

Figure 10:
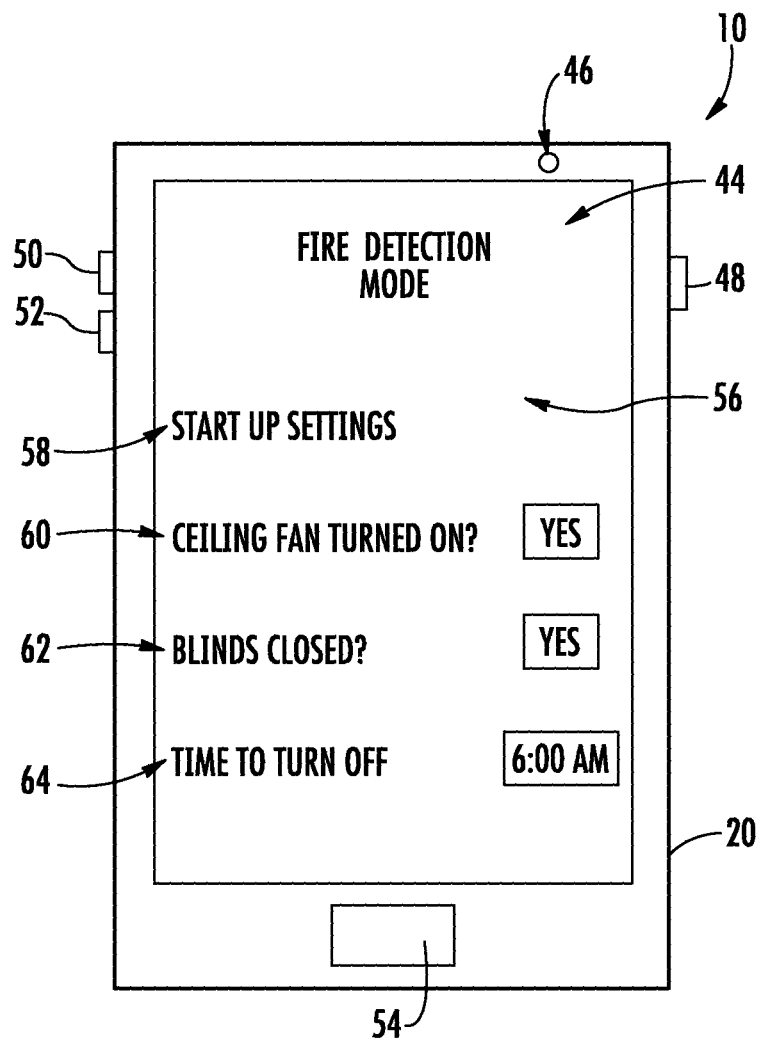
FIG. 10 is a front plan view of the smart phone of FIG. 9.

FIG. 10 shows the front side of the smart phone of FIG. 9 in which the screen 44 displays information relevant to the fire detection device 10. The analysis portion of the fire detection device 10 may be an application, or app, that is downloaded onto the smart phone or otherwise available to the smart phone. Accordingly, the app may direct the operation of the steps or perform the methods described above. For instance, the app may control the camera 22 and the light source 24 and can direct the processing of the information obtained in order to determine whether an alarm should be sounded. If so, the app may instruct the speaker of the smart phone to emit an audible warning, the screen 44 of the smart phone to emit a visual warning, or vibration of the smart phone to activate in order to alert the user that a fire 92 is taking place. Although described as alerting directly at the fire detection device 10, the alarm may be a phone call, text message, or other communication sent over a wired or wireless network to one or more monitoring stations, such as a fire department or a police station. The alarm may be sent to other devices remote from the fire detection device 10 in certain arrangements. The alarm may be sent to any designated individuals or entities such as fire departments, EMS, or police.

The smart phone may have a physical button 54 located on the front face of the smart phone that is used to control certain features of the smart phone and to provide input. The smart phone includes a second camera 46 that can likewise be used to capture images. In this regard, the smart phone could be placed on its back side so that the screen 44 and the second camera 46 point upwards towards the ceiling 18, and away from the upper surface of the table 16. The fire detection device 10 may function so that the second camera 46 acquires the necessary images. A secondary light source 24 may be present as a different device from the smart phone that may be controlled by the smart phone or not controlled by the smart phone. The screen 44 may provide sufficient illumination so as to function as the light source 24. In yet other arrangements, the fire detection device 10 does not employ a light source 24 and may take the images and prepare the analysis without the use of light 28 generated by the fire detection device 10.

The app that may be included in the fire detection device 10 may present certain information on the screen 44 to inform the user of the functioning of the fire detection device 10, and to request information from the user to help the fire detection device 10 identify fire 92. A title 56 of the application can be displayed on the screen 44 in order to inform the user that the smart phone is functioning in fire detection mode. The screen 44 may also present the user with a start-up screen 58 that informs the user that the fire detection device 10 is in is the startup mode. The start-up screen 58 may inform the user that the fire detection device 10 has not yet started imaging the room, and may request input from the user in order obtain information that may better help the fire detection system 10 in determining whether a fire 92 is present.

The start-up screen 58 may request the user enter a first setting 60 that can ask the user whether a ceiling fan is or is not turned on in the room when the fire detection device 10 is functioning to check for a fire 92. The user can use the smart phone to enter a yes or no answer, and the fire detection device 10 can adjust its sensitivity according to whether a ceiling fan is running. The presence of a running ceiling fan may contribute to variations in the lightness and darkness sensed during monitoring.

The start-up screen 58 may also have a second setting 62 that asks the user whether the blinds to the room are open or closed. Open blinds may cause light from the outside to enter the room, and associated movement and shadows may be present within the room that could be imaged by the camera 22. The fire detection device 10 may be programmed with different sensitivity depending upon whether this movement is or is not to be expected in view of the fact that light and other non-fire related movements can be present in the room if the blinds are open. Another third setting 64 may further be presented to the user at the start-up screen 58 which asks the user how long the fire detection device 10 should function in fire detection mode. If the user plans on getting up at 6:00 am, power can be saved by shutting off the fire detection mode at this time, or if movement in the room is expected by the user turning on lights and so forth at 6:00 am then the frequency of false alarms can be minimized or eliminated if the fire detection device 10 is not used when it is not needed.

The fire detection device 10 may be a mobile device that the user can take with him or her to different locations. For example, the user can utilize the fire detection device 10 at different locations when traveling at such times and locations the user needs to sleep. The fire detection device 10 may be designed so that the camera 22, light source 24, and processor 34 are not mounted to a table 16, floor, wall or other surface in a room 12 but are instead separate from such surfaces and not attached. In other arrangements, the fire detection device 10 may in fact be an installed device that is in fact attached to a floor, table, or other surface in a room 12.

The fire detection device 10 may use a camera 22 that is additionally used as a security camera to monitor a room 12, hallway, parking lot, or other location. Images from the camera 22 may thus be used not only to detect fire 92, but to monitor for intruders or other activity. The fire detection device 10 may thus be incorporated into an all ready existing security system. In yet other arrangements, the fire detection device 10 may include some components of a desktop or laptop computer. For example, a camera 22 could be incorporated into a desktop or laptop computer and used to capture images. The processing of the images may be done by the desktop or laptop computer, or may be sent to a remote location for processing. The alarm 42 may be sounded at the desktop or laptop computer, or may be sounded at a location remote from the desktop or laptop computer. As such, in some arrangements the camera 22 may be mobile in that it is incorporated into a device that by nature is moved from place to place, or the camera 22 may be static in that it remains in a single location. In the instance where the camera 22 remains in a single location, it may be rigidly positioned such that it is incapable of moving, or may be capable of being panned and tilted so that different fields of view 26 are possible.

The fire detection device 10 can be employed at facilities such as concert halls, movie theaters, factories, and traffic tunnels to detect fire 92. Still further, the fire detection device 10 may also be used to detect smoke 14 from cigarettes in locations like restaurants and airplanes that prohibit smoking. The fire detection device 10 can be employed in any location in which one desires a determination as to whether fire 92 is or is not present.

The fire detection device 10 as used herein may be capable of detecting smoke 14 and then sounding the alarm because the presence of smoke 14 indicates that a fire 92 is present. Additionally, the fire detection device 10 may also be capable of detecting the flame produced by fire 92 in order to determine that the fire 92 is present. The aforementioned processing steps can be set up to check for brightness associated with a flame of the fire 92 and can sound an alarm if there is a flame detected.

In still further arrangements, the fire detection device 10 is capable of detecting smoke 14 of the fire 92, but cannot and is not capable of detecting the actual flame of the fire 92. The fire detection device 10 may alert that something is happening, flame, without even detecting flame. An alarm may thus be given even though the actual item detected is not even recognized or seen by the device 10. The fire detection device 10 may not take texture or color of the image into account when determining whether smoke 14 is present. In certain arrangements, the fire detection device 10 may only look at intensity of the pixels and location of the pixels relative to the pixel array 66 when looking for smoke 14. In some embodiments, the fire detection device 10 may look for specific properties of smoke 14 and alert based on these properties. For instance, the device 10 may look for how smoke 14 moves across a room 12 in order to determine whether smoke 14 is or is not present when analyzing the captured images. It is to be understood that as used herein, such as in the specification and claims, that the detection of fire 92 can be inferred from the detection of smoke 14 such that the alarm can be generated to alert that fire 92 is present even if only smoke 14 is detected. The device 10 may thus be a fire detection device 10 even if it only detects smoke 14, and not fire 92 directly, or if it detects both smoke 14 and fire 92 directly.

The present invention is also directed to methods of detecting smoke in an area, such as in a field of view 26 of the fire detection device 10 and/or camera 22 as described above. These methods of detection may include analyses as described above or the methods described below. They may be performed by an app that may run on a smart phone or other device 10, or a software program that may run on a processor 34, image analyzer 38 or image comparator 40 of such a device 10, as described previously.

Figure 13:
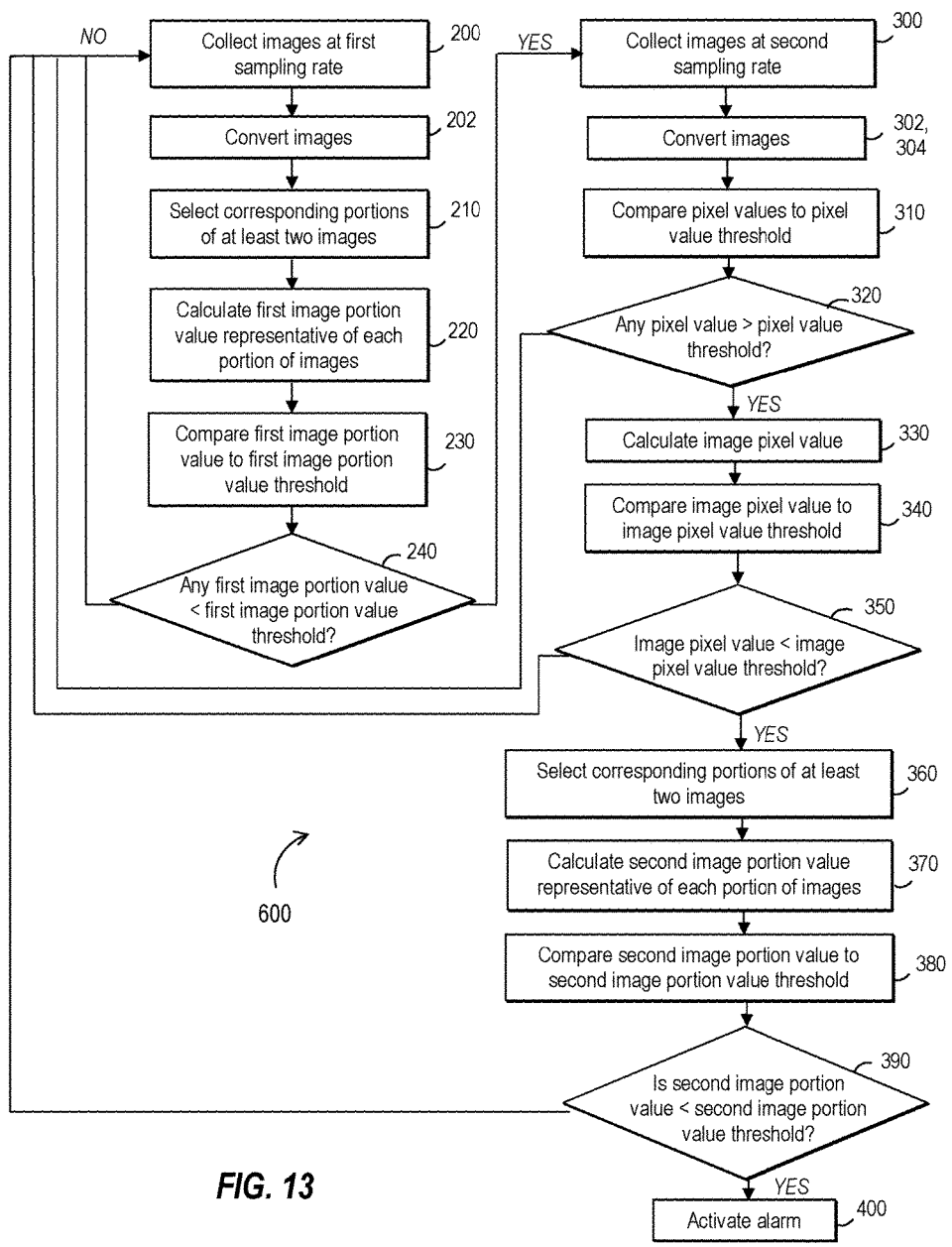
FIG. 13 is a flow chart showing an embodiment of the method of detecting smoke of the present invention using both monitoring and validation.

In at least one embodiment, as shown in FIG. 13, one method 600 of detecting smoke involves monitoring an area or field of view 26 for changes in the environment, and if changes are detected, then validating that the changes are indicative of smoke. This method 600 begins with monitoring the field of view 26, which includes first collecting a plurality of electronic images at a first sampling rate, as at 200. These electronic images are collected with an image collection device, which may be a camera 22 as discussed previously. The electronic images may be digital images, such as may be captured by any device having digital image taking capabilities. This includes, but is not limited to, a camera 22 on a smartphone, tablet, or other mobile device, or a camera 22 as may be part of a security camera system.

Figure 14:
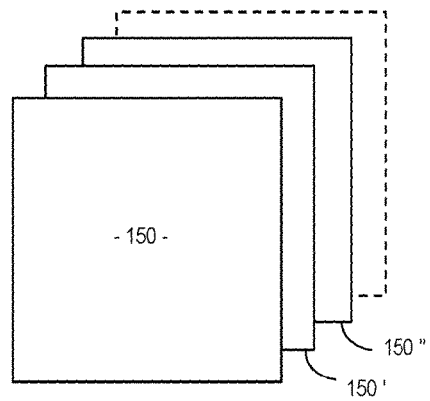
FIG. 14 is a schematic representation of a plurality of electronic images.

As depicted in FIG. 14, the electronic images 150 may be collected sequentially over a period of time, which may be at regular intervals. For example, the first sampling rate used in the monitoring stage of the present method may be defined as collecting a new electronic image of the field of view 26 every few seconds, or one image every multiple seconds. In one example, the first sampling rate is defined as a new electronic image every 2 to 5 seconds. In a preferred embodiment, the first sampling rate may be every 3 seconds. Other time intervals are possible and contemplated herein, and may vary depending on how closely or frequently one wishes to monitor the field of view 26. Accordingly, as the method continues, additional electronic images 150', 150" are taken of the field of view 26 at slightly different times. The electronic images taken at the first sampling rate may also be referred to herein as "monitoring images."

The electronic images 150, 150', 150" may be collected at any resolution of the image collecting device. For example, in at least one embodiment the image collection device is a camera 22, which may be an 8-bit, 12-bit, 14-bit or 16-bit camera. Other bit-depths may also be used. In addition, the resolution of the camera may be any resolution appropriate for image collection. The resolution may therefore be in the megapixel range, such as 1 to 20 megapixels, which indicates the number of pixels that will be captured in each image collected. The more pixels, the higher the image quality and more detail included in the image. In some embodiments, a lower resolution may be preferred, such as to keep the processing load low. In other embodiments, higher resolution may be desired, such as when the field of view 26 is large, expansive, or covering a distance (as in a large room or warehouse) and additional detail may be useful for image enhancement and/or zooming. In at least one embodiment, the resolution used may be on the order of 1 megapixel, such as produces images of 1024×1024 pixels. In other embodiments, the resolution may be below the megapixel range, such as 256×256 or 640×480.

In addition, the electronic images may be collected in color ("RGB") or grayscale. The methods described herein may be performed on either type of electronic image, RGB or grayscale, which may have any number of values per pixel. For example, an 8-bit camera will provide 256 values ($2^8$) per pixel. A 12-bit camera will provide 4096 values ($2^{12}$) per pixel. In at least one embodiment, the method includes a step of converting the electronic images from RGB to grayscale, as at 202 in FIG. 13. This may simplify the calculations performed later in the method, which may be beneficial if processor capacity is limited, or if increased computing time is preferred. In one embodiment, converting images from RGB to grayscale involves taking the average of the values for each pixel. For example, each pixel in an RGB image will have a value for red, another value for green, and a third value for blue in the pixel. To convert to grayscale, the average is taken of the red, green and blue values to arrive at a single value. This is used as the grayscale value for that pixel. This process is repeated for each pixel in the image, until each pixel is defined by an average value instead of three color values. This constitutes the converted grayscale image. If images are collected in RGB and the method of detecting smoke is desired to be performed with grayscale images, this conversion process is performed on each electronic image 150, 150', 150" taken. Conversion from grayscale to RGB or between different color schemes, filters or gradients is also contemplated herein.

In addition, the electronic images 150, 150', 150" may capture images in the visible light spectrum, but also in ultraviolet, infrared, or other parts of the electromagnetic spectrum. For example, the visible light spectrum falls in the range of about 390-700 nm wavelength. The ultraviolet spectrum falls in the range of about 10-390 nm in wavelength. The infrared spectrum falls in the range of about 700 nm-1 mm. Accordingly, the camera 22 may be a visible light camera, or may be infrared, UV, or other type of camera. In some embodiments, the camera 22 may include night-vision capabilities to detect smoke in low-light or no light circumstances. In other embodiments, the camera 22 may also detect thermal imaging, heat signatures (such as may be useful in detecting smokeless fires, including smoldering embers), lightwave distortion from heat (such as shimmering or heat haze), hydrodynamic properties involving heat, and flame.

In some embodiments, the device 10 may include a light sensor 27 that detects and/or quantifies the amount of light present in the field of view 26, such as may be detectable by light intensity or photon detection. The light may be of any wavelength, as described above. The method may include detecting the amount of light in the field of view, and activating a light source 28 if less than a predetermined level of light is detected. For example, a low-lit field of view, such as one where there are no overhead lights turned on or only ambient light present from surrounding areas, may fall below the threshold of light required for image collection by the image collection device 22. In these embodiments, the light 28 may be activated to add enough light to rise above the light threshold so images may be collected. In other embodiments, low light may be preferable, such as when monitoring a room while a person is sleeping. In these embodiments, the light threshold may be much lower, or may effectively be zero. The light threshold may depend on the particular image collection device 22 used, and the type or wavelength of light used by the image collection device 22. Accordingly, the light threshold will be different for visible light cameras 22 than it is for infrared or UV cameras. It should also be understood that, in some embodiments of the method, the detection and/or addition of light to the field of view 26 may not be necessary or preferred.

Figure 15:
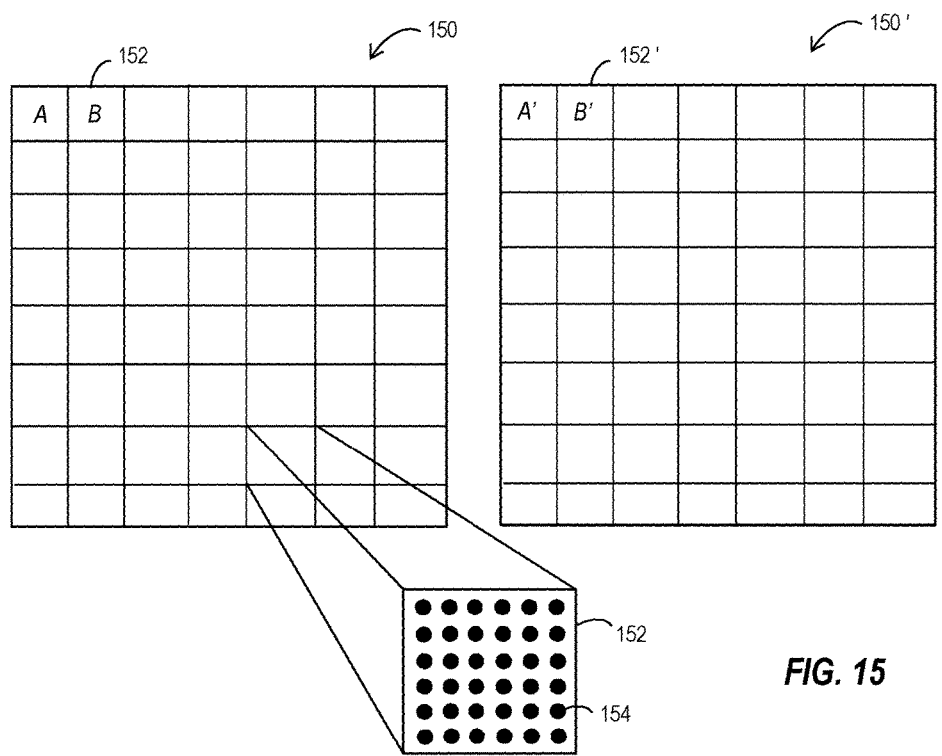
FIG. 15 is a schematic representation of corresponding images, showing portions thereof and pixels.

Returning now to FIG. 13, once there are at least two electronic images 150, 150' taken at the first sampling rate, the method 600 further includes selecting corresponding portions of at least two of the electronic images, as at 210. For example, as shown in FIG. 15 each electronic image 150, 150' may be parsed or subdivided into portions 152, 152'. Each corresponding image 150, 150' will be similarly parsed, so that each has the same size and number of portions 152, 152'. Accordingly, the portions 152 of one electronic image 150 will correspond to similarly situated portions 152' of another electronic image 150'. For instance, a first portion 152 denoted as A in FIG. 15 will correspond to a similarly situated first portion 152' denoted as A' in a subsequent image 150'. Likewise, a second portion 152 denoted as B in a first image 150 will correspond to a similarly situated second portion 152' denoted as B' in the subsequent image 150'. This pattern continues for the entirety of each image 150, 150'.

Portions 152, 152' may be any subset of the total electronic image 150, 150'. For example, in some embodiments, the portions 152 may be as small as a single pixel 154. In other embodiments, as shown in FIG. 15, each portion 152 may be a tile comprising a plurality of pixels 154. As used herein, "portion" and "tile" may be used interchangeably, although it should be understood that the portion 152 may be of any size and shape and is not limited to a tile. The portion 152 may include any number of pixels 154. The greater the number of portions 152 per image 150, the fewer number of pixels 154 each portion 152 will include, and vice versa.

The number of portions 152 or tiles an image 150 is divided into will depend on the resolution of the image collection device 22 and the level of detail desired for the monitoring of the field of view 26. The portions 152, 152' of the first plurality of images may be a subset of the total image 150, 150', and may be any size thereof. For example, in at least one embodiment, the portions 152, 152' of the first plurality of images are tiles of the images 150, 150', where each tile includes a plurality of pixels 154. In some embodiments, the portions 152, 152' of the second plurality of images may be as small as individual pixels 154. However, portions 152, 152' sized too small provide too much data to be useful, and portions 152, 152' sized too large fail to provide enough data to be useful. Therefore, in at least one embodiment, each portion 152, 152' of the first plurality of images is up to 10% of the total image size. In other embodiments, each portion 152 is 2%-4% of the image 150. In still other embodiments, each portion 152 is less than 1% of the image 150.

The size of the portions 152, 152' may also be described in terms of the ratio of portions 152 to pixels 154, or the number of pixels 154 each portion 152 includes. This may depend on the resolution of the image collecting device 22 used and other settings or parameters used for collecting the plurality of images. For example, in at least one embodiment, the ratio of portions 152 to pixels 154 may be in the range of 1:500 to 1:2000. For instance, if an 8-bit depth image collection device 22 is used, the total image size is 1024×1024 pixels and the total number of pixels is 1,048,576. If this image is parsed into portions 152 that are each 32×32 pixels in size, each portion 152 contains 1024 pixels, so that each image 150 is 32 portions wide and 32 portions across. The ratio of portions 152 to pixels 154 is therefore 1:1024. In terms of percentages, each portion 156 contains 0.097%, or 0.01%, of the pixels 154 for the total image 150.

In another example, the first plurality of images are collected using an 8 megapixel camera and the images 150 may be 2448×3264 pixels, yielding a total of 7,990,272 pixels. If these images 150 may be parsed into portions 152 that are 34×34 pixels in size, each portion 152 contains 1156 pixels, and are therefore 96 tiles wide and 72 tiles high. The ratio of portions 152 to pixels 154 is 1:1156. In terms of percentages, each portion 152 therefore contains 0.01% of the pixels 154 for the total image 150.

Of course, the portions 152 need not be identical in size. For example, in still another embodiment utilizing a 12 megapixel camera, the images 150 may be 4256×2832 pixels, yielding a total of 12,052,992 pixels. These images may be parsed into portions that are each 34×32 pixels in size, each portion 152 contains 768 pixels, such that the image is 133 tiles wide and 118 tiles high. This yields a ratio of 1:768 portions to pixels. In terms of percentages, each portion 152 therefore contains 0.006% of the pixels 154 of the total image 150. These are but a few illustrative examples, and are not intended to be limiting in any way.

The method 600 continues by calculating a first image portion value representative of each portion, as at 220. This image portion value is a quantitative value reflecting the pixel information in each portion 152, which may be a numerical value or other value. Accordingly, each portion 152, 152' will have its own image portion value. The image portion value may be a whole number, fraction, decimal, and may be a positive or negative number. Since the method 600 is monitoring a field of view 26 for changes, the image portion values are comparison values determined by comparing corresponding portions 152, 152' between at least two images 150, 150'. For instance, a first electronic image 150 is defined as the reference image, and one of the subsequent images 150', 150" is compared to the reference image 150. Therefore, the first image 150 may be the reference image, and the next image 150' may be compared to the reference image 150. The following image 150" may also be compared to the first image 150, or may be compared to the intervening image 150' as a reference image.

Figure 16:
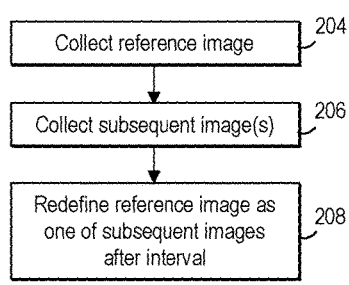
FIG. 16 is a flow chart showing how the reference frame is updated in the present method.

In at least one embodiment, the method 600 includes periodic updating of the reference image, depicted schematically in FIG. 16. This accommodates slow changes in the field of view 26, such as drift of the scene, and ensures the method is continuing to be performed on accurate information. With updating, any changes that are detected during monitoring are more likely to be actual changes in the field of view 26 and less likely to be false positives. Updating includes collecting a first electronic image 150 and defining this first image as the reference image, as at 204. It further includes collecting at least one subsequent image 150', 150" at the same sampling rate for comparison to the reference image 150, as at 206. Accordingly, one or more than one subsequent images 150', 150" may be collected. Finally, it includes redefining the reference image 150 as one of the subsequent images 150', 150" at a predetermined interval, as at 208. The new reference image 150 is therefore one of the later collected images, although in at least one embodiment it may be a later image collected solely for the purpose of being a reference image. The predetermined interval at which the reference image 150 is redefined may be a time interval, a number interval, such as a certain number of images, or other type of interval. For example, in at least one embodiment, the reference image 150 is redefined periodically by the seconds. The interval may be 2-10 seconds in one example. In another example it may be 6 seconds or 9 seconds. In other embodiments, the predetermined interval is a number of subsequent images 150', 150" collected. The interval may be 2-4 subsequent images. In at least one embodiment, the reference image 150 may be updated every 3 subsequent images. As noted above, updating the reference image 150 continues throughout the monitoring process and occurs periodically at every predetermined interval.

In at least one embodiment, calculating the image portion value includes performing an error function calculation between corresponding portions 152, 152' of at least two electronic images 150, 150'. With reference to FIG. 14, these images 150, 150' may be adjacent to one another, meaning that there are no intervening images 150 taken between. However, in some embodiments, these images 150, 150' may have one or more intervening image(s) 150 between, such that image 150 may be compared to image 150", for example. Preferably, two images 150 are compared to each other, and an image portion value is calculated for each corresponding portion 152. This process may be repeated for each pair of images 150 collected in the monitoring stage, which is ongoing.

In calculating the image portion value, each corresponding portion 152, 152' is compared and an error function is performed on each pixel in the portion to determine how similar, or dissimilar, the corresponding portions 152, 152' are in a quantifiable way. The error function may be any error function as permits determining the similarity or difference between two items, and may include numerical calculations. For example, the error function may be one of normalized scalar product, scalar product, correlation coefficient, sum of squared differences, dot product, vector dot product, non-standard dot product, root mean squared, or other comparison calculation.

In at least one embodiment, the first image portion value is a correlation coefficient representing each portion 152. In this embodiment, corresponding portions 152, 152' are compared from different images 150, 150' on a pixel-by-pixel level. Corresponding pixels 154 from each portion 152, 152' are compared, and a correlation coefficient for the portion may be determined according to the following formula:

$$c = \frac{\sum_i (x_i - \bar{x})(y_i - \bar{y})}{\sqrt{\sum_i (x_i - \bar{x})^{\wedge}2 \sum_j (y_i - \bar{y})^{\wedge}2}} \quad (1)$$

where c is the correlation coefficient for a particular portion 152, and x and y indicate the coordinates for each pixel within the portions i and j, such that the value for each pixel x, y are compared between portions i, j. Each pixel 154 will therefore have a correlation coefficient, and the correlation coefficient for the portion 152 is therefore the sum of the correlation coefficients for each corresponding pixel within the compared portions 152, 152'. The correlation coefficient c will be in the range of 1 to −1, where 1 indicates the portions compared are the most similar (no change), and −1 indicates the portions compared are the most dissimilar (change).

In other embodiments, the first image portion value is the standard normalized scalar product, which may be determined by the following formula:

$$\gamma = \frac{\sum_i x_i y_i}{\sqrt{\sum_i x_i^2} \sqrt{\sum_j y_i^2}} \quad (2)$$

where y is the normalized scalar product, x and y indicate the coordinates for each pixel within the portions i and j, such that the value for each pixel x, y are compared between portions i, j. Each pixel 154 will have a normalized scalar product y, and all the normalized scalar products y of all the pixels within a particular portion 152 are aggregated together to form the first image portion value. The normalized scalar product y may be in the range of 1 to −1, where 1 indicates the most similarity, and −1 indicates the most change between the compared image portions 152.

In the above examples, the image portion value is a measure of similarity between the compared image portions 152. In some embodiments, however, such as when the image portion value is calculated by using the sum of squared differences, a measure of difference between the compared image portions 152 may be calculated. In such embodiments, increasing values indicate more change, and lesser values indicate less change. Further, the range of values for the image portion value will depend on which function is used to calculate the image portion value. For instance, correlation coefficient and standard normalized scalar product calculations produce values between −1 and 1. Sum of squared difference calculations, on the other hand, have a minimum value of 0, indicating no change, and increasing values that indicate change.

As shown in FIG. 13, the method 600 continues with comparing the first image portion value as calculated to a first predetermined image portion value threshold, as at 230. The image portion value threshold indicates the level of sensitivity of the monitoring. Values falling below the image portion value threshold indicate a low level of similarity to the reference image, or that a change has occurred in the field of view 26. Values above the threshold indicate a higher level of similarity, or less change in the field of view 26. Therefore, the threshold may be set higher or lower depending on how sensitive the monitoring is desired to be. The higher the threshold is set, the more sensitive the monitoring system is, in which only slight changes will indicate a change in the scene and that the method 600 should continue.

The first image portion value threshold also depends on the particular function used to calculate the image portion value. For example, in at least one embodiment in which the standard normalized scalar product is used to calculate the image portion values, the first image portion value threshold may be in the range of 0.75-0.99. In one embodiment, the image portion value threshold may be 0.95. It should be appreciated that the image portion value threshold will be somewhere in the range of possible values that can be produced using the particular error function calculation. For example, the image portion value threshold may not be less than zero when using the sum of squared differences to calculate the image portion value, since the lowest value possible using this function is zero.

When the first image portion value is compared to the first image portion value threshold, as at 230, whether the image portion value falls above or below the threshold is determined, as at 240. When the first image portion value is greater than the first image portion value threshold, this indicates the field of view 26 is not sufficient changed between images 150 to be of concern, and the method 600 continues with further monitoring. Specifically, the method 600 repeats with collecting electronic images at a first image sampling rate, as at 200, and continues through the above-described steps. In the event the first image portion value is less than the first image portion value threshold, this indicates a change in the field of view 26, and the method 600 continues with validation to ascertain whether the change detected is due to smoke or a smoke-like substance in the field of view 26.

In at least one embodiment, the first image portion value for each portion 152, 152' of each image 150, 150' may be compared to the first image portion value threshold, and a determination made for each portion 152, 152'. If any portion 152, 152' or tile of an image 150, 150' is less than the threshold, then a change is indicated and the method 600 continues. In another embodiment, the method 600 includes determining the lowest value of the first image portion values for all portion 152 of an image 150, as at 225, and only the lowest first image portion value is compared to the threshold. The method 600 continues only if this lowest value is less than the first image portion value threshold. This embodiment may be useful when processing capacity is at a premium or must be done quickly.

If a change is detected, as described above, the method 600 continues by collecting a second plurality of electronic images at a second sampling rate, as at 300 in FIG. 13. As with the first plurality of images, the second plurality of images are also collected using an image capturing device, such as a camera 22, as described above. Thus, the second plurality of electronic images 150, 150', 150" may be of any resolution or quality. In at least one embodiment, the second plurality of images are collected using the same image capturing device 22 as was used to collect the first plurality of images, and most preferably use the same configuration or settings of the image capturing device 22. For example, in one embodiment an 8-bit depth camera may be used to collect images of a field of view in the visible spectrum of light for both the first plurality of images at a first sampling rate, and a second plurality of images at a second sampling rate. In another embodiment, different configurations or specifications may be used for the first plurality and second plurality of images, such as if more or less detail is desired for the second plurality of images. As with the first plurality of images, the second plurality of images may be collected in either RGB or grayscale, and may be converted between RGB and grayscale, as at 302, as described previously.

The second sampling rate at which the second plurality of images is collected is greater than the first sampling rate at which the first plurality of images is collected. The sampling rate is the rate or frequency at which the electronic images 150, 150', 150" are collected. Since the second sampling rate is higher than the first, the second plurality of images are collected more frequently than the first plurality of images. This enables many more electronic images to be collected of the field of view 26, to provide more information for determining whether a smoke-like substance is present, as will become apparent from the description below.

In at least one embodiment, the second sampling rate is at least an order of magnitude greater than the first sampling rate. If the first sampling rate is one image collected every 3 seconds, then the second sampling rate may be one image collected every 0.3 seconds, or one image every 0.03 seconds (30 milliseconds). In at least one embodiment, the second sampling rate is multiple images collected per second. In such embodiments, the second plurality of images may comprise a video, such that the image collection device 22 takes a video of the field of view 26 rather than simply sequential still shots. As used herein, a "video" may be a sequence of images collected over a period of time taken at an interval of multiple frames per second, such as 30 frames per second, although it is understood that smaller or larger intervals may be utilized and are also contemplated herein. It should also be understood that the collection of the second plurality of electronic images need not occur by "video" but rather a sequence of images taken at a greater frequency than the first sampling rate. The interval may be considered the sampling rate, such as the second sampling rate. Accordingly, in at least one embodiment, the second sampling rate is 10 or more images per second, such as 10-50 images per second. In one embodiment, the second sampling rate is 30 images per second, as is consistent with the definition of video used herein.

The step of collecting a second plurality of images, as at 300, may occur for a predetermined period of time, such as 3 seconds to 3 minutes. For example, in one embodiment the collection of the second plurality of images occurs for a period of 5 seconds. During this time period, the second plurality of images is collected at the second sampling rate, which may be periodically or continuously. In at least one embodiment, collecting a second plurality of images continues until such time as the method 600 determines that there is no presence of smoke-like material, and the monitoring stage is resumed.

Each of the second plurality of electronic images 150, 150', 150" includes a plurality of pixels 154, each of which are defined by a pixel value. As used herein, "pixel value" means a quantitative numerical value representative of the intensity of an individual pixel. In at least one embodiment, the pixel value may be the raw numerical intensity of a given pixel. In at least one other embodiment, the pixel value may be defined as the resulting value from an error function calculation comparison of corresponding pixels from two or more images 150, 150', 150". The error function may be any of normalized scalar product, scalar product, correlation coefficient, sum of squared differences, dot product, vector dot product, non-standard dot product, root mean squared, or other comparison calculation, as described previously. In still other embodiments, the pixel value may be the result of a time derivative calculation for a particular pixel, as described below.

For instance, in at least one embodiment the method 600 includes converting the second plurality of electronic images 150, 150', 150" to a corresponding plurality of derivative images, as at 304. This conversion compares at least two of the second plurality of electronic images 150, 150', 150" to each other, and removes any similarities between them, thereby isolating only the changes from one electronic image to the next. This may be accomplished by any process that produces results which highlight or single out only the changes in an image. In at least one embodiment, converting to derivative images includes calculating the time derivative value, D, such as by centered finite differences using the formula:

$$D_{[x,y,t]} = \frac{i[x, y, t+1] - i[x, y, t-1]}{2} \quad (3)$$

where i is the image value for each pixel at position x, y and time t. Here, a new image is collected at every time t. Therefore, the centered finite differences calculation determines the change in x and in y of each pixel by comparing the values for that pixel from the images before and after the particular image in question, and dividing by 2. This is performed for each pixel 154 in each image taken at every time t. The aggregate of the time derivative values D produces a derivative image for each of the second plurality of images, but which now includes only the difference data, or data which changed from one image to the next, where the pixel value for each pixel 154 is a result of time derivative calculation.

The method 600 may further include determining the absolute value of derivative images, as at 306. For instance, since the derivative images indicate only the changes from one image to the next of the second plurality of images, the change may be positive or negative. Taking the absolute value of each D for each pixel converts each pixel value in the derivative images to a positive value, which may be beneficial in further calculations of the method.

The method 600 further includes comparing each of the pixel values in each of the second plurality of electronic images 150, 150', 150" to a predetermined pixel value threshold, as at 310. In embodiments which convert the second plurality of images to derivative images, as described above, the pixel values compared to the pixel value threshold are the derivative values, D. In other embodiments which do not convert to derivative images, but rather use the information from the second plurality of electronic images as collected (or as converted between RGB and grayscale), the pixel values compared to the pixel value threshold are the pixel values as described previously. The pixel value threshold is set at a value to establish the threshold over which large changes in the field of view 26 are indicated. Large changes in the field of view 26, such as a person walking through the room or object moving in the space, will produce a large pixel value or time derivative, D, as compared to smoke-like material, which produces more gradual changes and therefore smaller pixel values or deviations.

To rule out large changes that appear suddenly and are not due to smoke or smoke-like material, the pixel value threshold is set. This pixel value threshold may be dependent on a parameter of the image collection device 22, such as the dynamic range of a camera 22. As used herein, "dynamic range" means everything on the continuum defined between the brightest and darkest areas of an image. In at least one embodiment, the pixel value threshold is defined as one-fifth the dynamic range of the image collection device 22. For example, an 8-bit depth camera may have a dynamic range of 250, meaning the difference in pixel value between the brightest pixel and darkest pixel of an image is 250. The brightest pixel may have a value of 300, and the darkest pixel may have a value of 50, such that the difference between the two is 250. In this example, the pixel value threshold may be set at 50, which is one-fifth of 250. In other embodiments, the pixel value threshold may range from 10-80. In at least one embodiment, the pixel value threshold is 50. In another embodiment, the pixel value threshold is 70. In still another embodiment, the pixel value threshold is 20. These are illustrative examples of the pixel value threshold.

Upon comparison to the threshold, if any pixel value for any of the second plurality of electronic images is less than the pixel value threshold, then the method 600 returns to monitoring and collecting images at the first sampling rate again. If any pixel value is greater than the pixel value threshold, as at 320, then the method 600 includes calculating an image pixel value, as at 330, in FIG. 13. The image pixel value is representative of the number of pixels 154 in an electronic image 150 having a pixel value greater than the pixel value threshold. In other words, the image pixel value is the number of pixels having pixel values that exceed the pixel value threshold, and may be calculated by adding the number of pixels in an image 150 that meet the criteria. A large number of pixels exceeding the pixel value threshold indicates more than a fleeting occurrence and that the change detected in the field of view 26 is a large change, such as a person or object, and therefore due to something other than smoke-like materials. On the other hand, a small number of pixels exceeding the pixel value threshold indicates smoke-like material is present, and further analysis is performed.

The image pixel value threshold is therefore defined as a value which demarcates between large changes and small changes in the field of view 26. The image pixel value threshold may therefore be defined as a certain percentage of the total number of pixels in an image, or a certain number of pixels. For example, in at least one embodiment the image pixel value is defined as 0.001%-1% of the total number of pixels of the image 150. In one embodiment, the image pixel value threshold is about 0.04% of the total pixels. It should be understood that the image pixel value may be any value in this stated range, inclusive of the top and bottom values given. In other embodiments, it may be above or below the range stated above, depending on the level of sensitivity desired for the method 600. In other embodiments, the image pixel value threshold is defined as a number of pixels. For example, if the image is 1024×1024 pixels, then the total number of pixels in the image is 1,048,576 and the image pixel threshold may be 400 pixels. In other embodiments, the image pixel value threshold may be set lower, such as at 10 or 15 pixels, or may be set higher, such as 1,000 pixels. Again, the specific threshold will depend on the desired sensitivity of the method 600 to detect large changes in the field of view 26.

The method 600 therefore continues with comparing the image pixel value to the image pixel value threshold, as at 340. If the image pixel value is greater than the image pixel value threshold, then the change was due to a large change not likely to be smoke-like material, and the method 600 returns again to monitoring the field of view 26 as described previously.

If the changes detected are not determined to be a large change in the scene, they are further analyzed in order to begin the process of determining whether the changes are due to smoke-like material. Smoke and smoke-like material exhibits certain fluid dynamics. For instance, it is likely to move through an area with small, constant movement rather than the rapid or intermittent movement of large objects. Therefore, the method 600 can ascertain whether changes detected are from large objects, and whether they are small, constant changes consistent with smoke-like material dynamics.

Therefore, if the image pixel value discussed above is less than the image pixel value threshold, as at 350, then the method 600 further includes determining whether the changes are small, constant changes. Specifically, the method 600 includes selecting corresponding portions 152, 152' of at least two of the second plurality of images taken at the second sampling rate, as at 360. As discussed above in connection with the portions 152, 152' of the first plurality of images, the portions 152, 152' of the second plurality of images may be a subset of the total image 150, 150', and may be any size thereof. In at least one embodiment, the portions 152, 152' of the second plurality of images are tiles of the images 150, 150', where each tile includes a plurality of pixels 154. In some embodiments, the portions 152, 152' of the second plurality of images may be as small as individual pixels 154. However, portions 152, 152' sized too small provide too much data to be useful, and portions 152, 152' sized too large fail to provide enough data to be useful. Therefore, in at least one embodiment, each portion 152, 152' of the second plurality of images is up to 10% of the total image size. In other embodiments, each portion 152 is 2%-4% of the image 150. In still other embodiments, each portion 152 is less than 1% of the image 150.

The size of the portions 152, 152' may also be described in terms of the ratio of portions 152 to pixels 154, or the number of pixels 154 each portion 152 includes. This may depend on the resolution of the image collecting device 22 used and other settings or parameters used for collecting the second plurality of images. For example, in at least one embodiment, the ratio of portions 152 to pixels 154 may be in the range of 1:500 to 1:2000. For instance, if an 8-bit depth image collection device 22 is used, the total image 150 is 1024×1024 pixels and the total number of pixels is 1,048,576. If this image is parsed into portions 152 that are each 32×32 pixels in size, each portion 152 contains 1024 pixels. The ratio of portions 152 to pixels 154 is therefore 1:1024. In terms of percentages, each portion 156 contains 0.097%, or 0.01%, of the pixels 154 for the total image 150.

In another example, the second plurality of images are collected using an 8 megapixel camera and the images 150 may be 2448×3264 pixels, yielding a total of 7,990,272 pixels. If these images 150 may be parsed into portions 152 that are 34×34 pixels in size, each portion 152 contains 1156 pixels, and the ratio of portions 152 to pixels 154 is 1:1156. In terms of percentages, each portion 152 therefore contains 0.01% of the pixels 154 for the total image 150.

In still another embodiment utilizing a 12 megapixel camera, the images 150 may be 4256×2832 pixels, yielding a total of 12,052,992 pixels. If parsed into portions that are each 34×32 pixels in size, each portion 152 contains 768 pixels, for a ratio of 1:768 portions to pixels. In terms of percentages, each portion 152 therefore contains 0.006% of the pixels 154 of the total image 150. These are but a few illustrative examples, and are not intended to be limiting in any way.

Moreover, the second plurality of images 150, 150' may be parsed into the same number and/or sized portions 152, 152' as the first plurality of images were parsed into previously. In other embodiments, the second plurality of images 150, 150' may be parsed into a different number or sized portions 152, 152' from those of the first plurality of images. It should be appreciated that, since the second plurality of images are collected at a higher sampling rate than the first plurality of images, the second plurality of images provides much more information about the field of view 26 than the first plurality of images. This is understandable, since the second plurality of images are meant to verify or validate whether changes detected during the monitoring stage using the first plurality of images was due to smoke-like material or not. Moreover, at this point in the method 600, the second plurality of images has already been screened for large changes in the field not likely to be smoke-like material.

Once corresponding portions 152, 152' of the second plurality of images is selected, the method 600 further includes calculating a second quantitative image portion value representative of each corresponding portion 152 of the second plurality of images, as at 370 in FIG. 13. As with the first quantitative image portion value for the first plurality of images, the second quantitative image portion value for the second plurality of images may be calculated by performing an error function to compare corresponding portions 152, 152' of two images 150, 150'. The error function may be normalized scalar product, scalar product, correlation coefficient, sum of squared differences, dot product, vector dot product, non-standard dot product, root mean squared, or other calculation permitting quantitative comparison of two values. The resulting image portion values for each portion 152 of the second plurality of images may therefore be a quantitative measure of similarity, as discussed previously. In some embodiments, it may be a measure of difference between the corresponding portions 152, also as previously discussed. In embodiments where derivative images were calculated for the second plurality of images, the parsing of portions 152 and comparison of corresponding portions 152, 152' may be performed on the derivative images.

The method 600 further includes comparing each of the second image portion values to a second predetermined image portion value threshold, as at 380. The second image portion value threshold indicates the level of similarity, or difference, which may be tolerated by the method 600. The second image portion value threshold may be the same or different value as the first image portion value threshold. For example, in at least one embodiment, the second image portion value threshold is in the range of 0.7 to 0.99. In some embodiments, the second image portion value threshold is 0.95.

Second image portion values greater than the second image portion value threshold indicate no change, or changes that are so minor they are not of concern. However, second image portion values lower than the second image portion value threshold indicate small, constant changes in the field of view 26. Accordingly, if any second image portion value is less than the second image portion value threshold, as at 390, then the method 600 includes activating an alarm, as at 400. The alarm may be located in the alarm module 42 of the device 10, or may be external to the device 10. Further, the alarm may be audio, visual, tactile and/or vibratory, or may provide notification to a user through another sensory mechanism. For example, the alarm may be a sound which alerts people in the area to the presence of danger. In another embodiment, the alarm may be light(s) that may stay on or may pulse in a pattern, which provides notice and information of the danger. In other embodiments, the alarm may cause the device 10 to vibrate so that the vibrations may be heard and/or felt on a surface or through direct or indirect contact. In at least one embodiment, the alarm may be any combination of the above modes.

Figure 17:
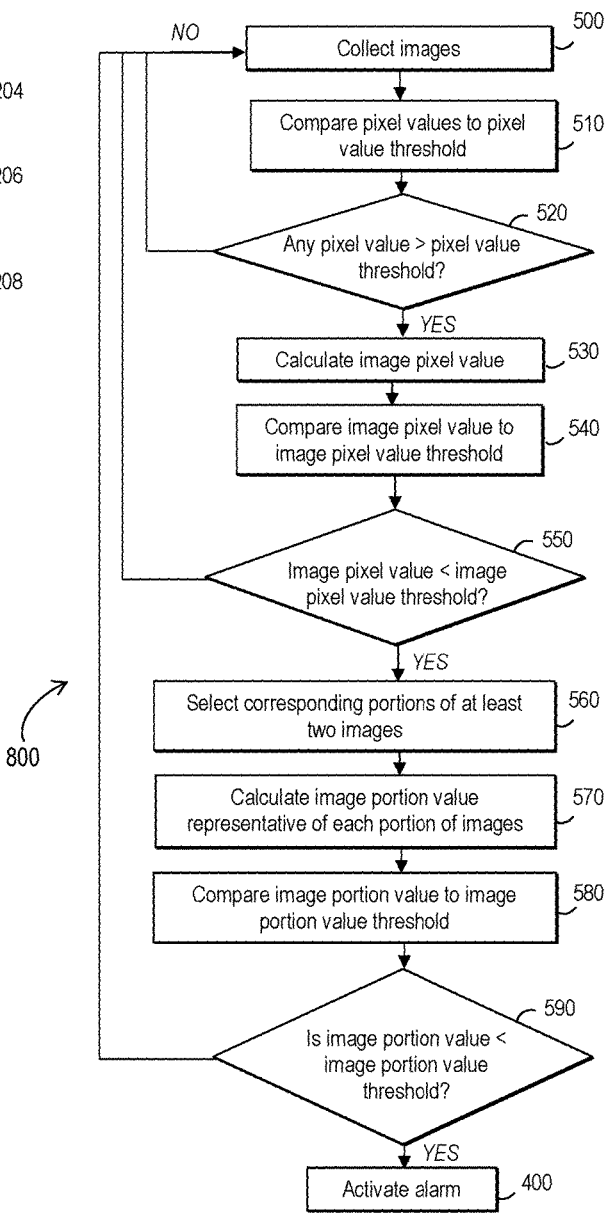
FIG. 17 is a flow chart showing another embodiment of the method of detecting smoke of the present invention using only validation.

Not all methods of the present invention require monitoring. For example, if processing capacity is not a concern and constant image collection and processing is possible, the method may forgo monitoring and instead constantly scan the field of view 26 for large and small changes, as described above for the validation stage. Accordingly, in at least one embodiment, as depicted in FIG. 17, the method 800 includes collecting a plurality of images, as at 500. These images are collected of the field of view 26 of an image collection device 22, and may be collected at any sampling rate and resolution, as described above. Accordingly, collecting a plurality of electronic images, as at 500, may include collecting a series of static images of the field of view 26, or may include taking a video over a predetermined period of time, as discussed in detail above. Each of the plurality of electronic images 150 collected includes a plurality of pixels 154, each having a quantitative pixel value.

The method 800 further includes comparing the quantitative pixel values of each pixel 154 to a predetermined pixel value threshold, as at 510. As before, the pixel value threshold may between 10-80 in some embodiments, and in at least one embodiment may be 50. If any of the pixel values are greater than the established pixel value threshold, as at 520, then the method 800 further includes calculating an image pixel value, as at 530. This image pixel value is the number of pixels 154 in the images 150 having a pixel value that exceeds the pixel value threshold. An image pixel value is calculated for each image 150, 150', 150" as described above, and compared to an image pixel value threshold, as at 540, and described above. As before, the image pixel value threshold may be a certain number of pixels, or percentage of the total pixels of the image. For example, the image pixel value threshold may be in the range of 0.001%-1% of the total pixels 154 in any one of the images 150. In another example, the image pixel value threshold may be between 100-1000 pixels, such as 400 pixels.

If the image pixel value for the image is greater than the image pixel value threshold, then the method 800 returns to collecting images, as at 500. If, however, the image pixel value is less than the image pixel value threshold, as at 550, then the method 800 further includes selecting corresponding portions 152, 152' of at least two of the plurality of electronic images, as at 560. These portions 152, 152' are subsets of the images 150, as described in detail previously, and may be tiles or as small as individual pixels. Once parsed into corresponding portions 152, 152', a quantitative image portion value is calculated representing each corresponding portion 152, 152', as at 570. This quantitative image portion value is as described above, and may be calculated by performing an error function between corresponding portions 152, 152'. Such error functions include, but are not limited to, normalized scalar product, scalar product, correlation coefficient, sum of squared differences, dot product, vector dot product, non-standard dot product, and root mean squared error.

Once the image portion values are calculated for each pair of corresponding portions 152, 152', the method 800 further includes comparing the image portion values to a predetermined image portion value threshold, as at 580. The image portion value threshold is sufficient to indicate small but constant changes in the field of view 26, as described above. In some examples, the image portion value threshold is in the range of 0.7-0.99. In at least one embodiment, the image portion value threshold is 0.95.

If the image portion values are greater than the image portion value threshold, then the method 800 resumes collecting images, as at 500. If the image portion value for at least one of the portions 152 is less than the image portion value threshold, as at 590, then the method 800 includes activating an alarm, as at 400. The alarm is as described previously.

In at least one embodiment, the methods 600, 800 described herein may operate constantly or without interruption. In some embodiments, the methods 600, 800 are performed by the device 10, image collection device 22, processor 34, image analyzer module 38, image comparator module 40, and/or alarm module 42 upon actuation of a button, setting, portion of a screen, or other mode of actuation. For instance, in embodiments where the methods 600, 800 are performed by an app or program, such as may be on a smartphone or mobile device 10, actuation of the method 600, 800 may occur by interacting with a portion of the start-up screen 58 of the app, such as by touching a region of the screen 44 denoting a button to commence the method 600, 800. Further, the method 600, 800 may continue until a predetermined period of operation expires, the method 600, 800 is canceled by actuation of a cancellation button, or the alarm is activated. The predetermined period of operation may be any amount of time, such as a few seconds or multiple hours or even days. In some embodiments, such as when the methods 600, 800 are performed using closed circuit imaging systems, such as CCTV systems, the methods 600, 800 may continue indefinitely until selectively stopped. In other embodiments, such as when utilizing a smartphone, the methods 600, 800 may stop after 10 minutes or 8 hours, or other such defined time. In at least one embodiment, a user of the device 10 may select the length of time for the method 600, 800 to be performed.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed is:

1. A method of detecting smoke in a field of view, comprising:
    collecting a plurality of electronic images of said field of view with an image collection device, wherein each of said electronic images includes a plurality of pixels each having a quantitative pixel value;
    comparing each of said pixel values in each of said plurality of electronic images to a predetermined pixel value threshold;
    calculating a quantitative image pixel value representative of the number of said pixels having pixel values exceeding said predetermined pixel value threshold if any of said individual pixel values exceeds said predetermined pixel value threshold;
    comparing said image pixel value to a predetermined image pixel value threshold;
    parsing at least two of said plurality of electronic images into portions based on the resolution of the image collection device and the level of detail desired for the monitoring of the field of view;
    selecting corresponding portions of the at least two of said plurality of electronic images if said image pixel value is less than said predetermined image pixel value threshold;
    calculating a quantitative image portion value representative of each of said corresponding portions of said at least two electronic images;
    comparing each of said image portion values to a predetermined image portion value threshold; and
    activating an alarm if said image portion value for at least one of said corresponding portions is less than said predetermined image portion value threshold.

2. The method as recited in claim 1, further comprising converting said plurality of electronic images to a corresponding plurality of derivative images of said field of view.

3. The method as recited in claim 2, wherein said quantitative pixel value is defined as an absolute value.

4. The method as recited in claim 1, wherein each of said portions of said at least two electronic images is a subset of said electronic image.

5. The method as recited in claim 4, wherein each of said portions of said at least two electronic images comprises up to 10% of said electronic image.

6. The method as recited in claim 5, wherein each of said portions of said at least two electronic images comprises between 2%-4% of said electronic image.

7. The method as recited in claim 5, wherein each of said portions of said at least two electronic images comprises less than 1% of said electronic image.

8. The method as recited in claim 4, wherein the ratio of said portions of said at least two electronic images to the total pixels in each of said electronic images is in the range of 1:500 to 1:2000.

9. The method as recited in claim 8, wherein the ratio of said portions of said at least two electronic images to the total pixels in each of said electronic images is 1:1024.

10. The method as recited in claim 8, wherein the ratio of said portions of said at least two electronic images to the total pixels in each of said electronic images is 1:1156.

11. The method as recited in claim 1, wherein said predetermined pixel value threshold is dependent on a dynamic range of said image collecting device.

12. The method as recited in claim 11, wherein said predetermined pixel value threshold is at least one-fifth of the dynamic range of said image collecting device.

13. The method as recited in claim 1, wherein said predetermined pixel value threshold is defined as a digitized value proportionate to the pixel intensity and the threshold is defined as a value between 10 and 80.

14. The method as recited in claim 13, wherein said predetermined pixel value threshold is defined as 50.

15. The method as recited in claim 1, wherein said predetermined image pixel value threshold is defined as a certain percentage of the total number of pixels in an image, and the threshold is defined as a value in the range of 0.001%-0.1% of the total pixels in any one of said electronic images.

16. The method as recited in claim 15, wherein said predetermined image pixel value threshold is defined as a digitized value proportionate to the pixel intensity and the threshold is defined as a value of at least 400.

17. The method as recited in claim 1, wherein the image portion value is the result of an error function which is performed on at least one set of corresponding portions and said predetermined image portion value threshold is defined as a value between 0.75 and 0.99.

18. The method as recited in claim 17, wherein said predetermined image portion value threshold is defined as 0.95.

19. The method as recited in claim 1, wherein calculating a quantitative image portion value includes performing an error function calculation between corresponding portions of said at least two electronic images.

20. The method as recited in claim 19, wherein said error function is selected from the group consisting of a normalized scalar product, scalar product, correlation coefficient, sum of squared differences, dot product, vector dot product, non-standard dot product, and root mean squared.

21. The method as recited in claim 1, wherein said plurality of electronic images are at least one of RGB and grayscale.

22. The method as recited in claim 21, further comprising converting said plurality of electronic images between RGB and grayscale.

23. A method of detecting smoke in field of view, comprising:
collecting a first plurality of electronic images of said field of view with an image collection device at a first sampling rate;
selecting corresponding portions of at least two of said first plurality of electronic images;
calculating a first quantitative image portion value representative of each of said corresponding portions of said at least two electronic images from said first plurality of images;
comparing said first image portion values representative of each of said corresponding portions of said at least two electronic images from said first plurality of images to a first predetermined image portion value threshold;
collecting a second plurality of electronic images of said field of view with an image collection device at a second sampling rate greater than said first sampling rate if any of said first image portion values is less than said predetermined first image portion value threshold, wherein each of said second plurality of electronic images includes a plurality of pixels each defined by a quantitative pixel value;
comparing each of said pixel values in each of said second plurality of electronic images to a predetermined pixel value threshold;
calculating a quantitative image pixel value representative of the number of said pixels having pixel values exceeding said predetermined pixel value threshold if any of said individual pixel values exceeds said predetermined pixel value threshold;
comparing said image pixel value to a predetermined image pixel value threshold;
parsing at least two of said second plurality of electronic images into portions based on the resolution of the image collection device and the level of detail desired for the monitoring of the field of view;
selecting corresponding portions of the at least two of said second plurality of electronic images if said image pixel value is less than said predetermined image pixel value threshold;
calculating a second quantitative image portion value representative of each of said corresponding portions of said at least two electronic images of said second plurality of images;
comparing each of said second image portion values to a second predetermined image portion value threshold; and
activating an alarm if said second image portion value for at least one of said corresponding portions is less than said second predetermined image portion value threshold.

24. The method as recited in claim 23, wherein said second sampling rate is at least one order of magnitude greater than said first sampling rate.

25. The method as recited in claim 23, wherein said first sampling rate is one image every multiple seconds.

26. The method as recited in claim 25, wherein said first sampling rate is one image every 2-5 seconds.

27. The method as recited in claim 23, wherein said second sampling rate is multiple images per second.

28. The method as recited in claim 27, wherein said second sampling rate is 10-50 images per second.

29. The method as recited in claim 23, wherein the first image portion value is the result of an error function which is performed on at least one set of corresponding portions and said first predetermined image portion value threshold is defined to be a value between 0.70 and 0.99.

30. The method as recited in claim 29, wherein said first predetermined image portion value threshold is defined as 0.95.

31. The method as recited in claim 23, wherein calculating said first image portion value and said second image portion value includes performing an error function calculation between corresponding portions of said at least two electronic images.

32. The method as recited in claim 31, wherein said error function is selected from the group consisting of a normalized scalar product, scalar product, correlation coefficient, sum of squared differences, dot product, vector dot product, non-standard dot product, and root mean squared.

33. The method as recited in claim 23, further comprising:
determining the lowest value of said first image portion values of said corresponding portions of said at least two electronic images from said first plurality of images;
comparing said lowest value of said first image portion values to a predetermined first image portion value threshold; and
collecting a second plurality of electronic images of said field of view with an image collection device at a second sampling rate greater than said first sampling rate if said lowest value of said first image portion values is less than said predetermined first image portion value threshold.

34. The method as recited in claim 23, further comprising the steps of:
defining a reference image by collecting a first electronic image and defining said first electronic image as the reference image, and
at a predetermined interval, updating the reference image by collecting at least one subsequent electronic image and redefining at least one of said subsequent electronic images as the reference image.

35. The method as recited in claim 34, wherein said predetermined interval is a time interval.

36. The method as recited in claim 35, wherein said predetermined interval is 2-10 seconds.

37. The method as recited in claim 36, wherein said predetermined interval is 9 seconds.

38. The method as recited in claim 34, wherein said predetermined interval is a number of subsequent electronic images.

39. The method as recited in claim 38, wherein said predetermined interval is 2-4 subsequent electronic images.

40. The method as recited in claim 39, wherein said predetermined interval is 3 subsequent electronic images.

41. The method as recited in claim 23, wherein said first and second plurality of electronic images are at least one of RGB and grayscale.

42. The method as recited in claim 41, further comprising converting said first and second plurality of electronic images between RGB and grayscale.

* * * * *